US006952163B2

(12) United States Patent
Huey et al.

(10) Patent No.: US 6,952,163 B2
(45) Date of Patent: Oct. 4, 2005

(54) COMBINED SYSTEMS USER INTERFACE FOR CENTRALIZED MONITORING OF A SCREENING CHECKPOINT FOR PASSENGERS AND BAGGAGE

(75) Inventors: John H. Huey, Chevy Chase, MD (US); Stephen Wolff, San Diego, CA (US)

(73) Assignee: Quantum Magnetics, Inc., San Diego, CA (US)

( * ) Notice: Subject to any disclaimer, the term of this patent is extended or adjusted under 35 U.S.C. 154(b) by 88 days.

(21) Appl. No.: 10/460,509

(22) Filed: Jun. 11, 2003

(65) Prior Publication Data

US 2005/0024199 A1 Feb. 3, 2005

(51) Int. Cl.[7] .............................................. G08B 19/00
(52) U.S. Cl. ...................... 340/521; 340/541; 340/5.12; 340/5.3; 340/5.32; 340/5.7
(58) Field of Search ................................ 340/521, 541, 340/5.12, 5.3, 5.32, 5.7

(56) References Cited

U.S. PATENT DOCUMENTS

| | | | | |
|---|---|---|---|---|
| 5,183,008 A | * | 2/1993 | Carrano ...................... | 119/840 |
| 5,212,909 A | * | 5/1993 | Morin ........................... | 49/49 |
| 5,335,710 A | * | 8/1994 | Belanger ..................... | 160/118 |
| 6,600,303 B2 | | 2/1997 | Husseiny et al. | |
| 5,845,692 A | * | 12/1998 | Kellem et al. .............. | 160/118 |
| 6,334,385 B1 | | 1/2002 | Linker et al. | |
| 6,507,278 B1 | * | 1/2003 | Brunetti et al. ............. | 340/541 |
| 2002/0078767 A1 | | 6/2002 | Jenkins et al. | |
| 2003/0056113 A1 | | 3/2003 | Korosec | |
| 2003/0070076 A1 | | 4/2003 | Michael | |
| 2003/0171939 A1 | | 9/2003 | Yagash et al. | |

OTHER PUBLICATIONS

Steve Martyn, GRSI technical article, "A Total Mail And Parcel Security Management System," Glen Road Systems, Inc., Conshohocken, PA.
Quantum Magnetics, Inc., QSCAN QR 160 technical specification, "Entry–Point Screening for Explosives," Quantum Magnetics, Inc., San Diego, CA.
Quantum Magnetics, Inc., I–portal 100 technical specification, "Advanced Weapons Detection Portal," Quantum Magnetics, Inc., San Diego, CA.
Metorex Security Products, Inc., Metor 150 technical specification, "Walk Through Metal Detector," Metorex Security Products, Inc., Ewing, NJ.
Metorex Security Products, Inc., Metor 200 technical specification, "Multi–Zone Walk Through Metal Detector," Metorex Security Products, Inc., Ewing, NJ.

(Continued)

*Primary Examiner*—Daryl C Pope
(74) *Attorney, Agent, or Firm*—Cantor Colburn LLP

(57) ABSTRACT

A combined systems user interface (CUI) may be configured with an advanced technology screening checkpoint (ATSC), which is a passenger-friendly, high performance system for screening passengers and carry-on items to detect assembled bombs, bomb components, metallic and non-metallic weapons, and other contraband items. The CUI may include a baggage, passenger, and secondary screening status regions. The baggage screening status region displays screening information generated by an explosives screening system and a baggage imaging system, while the passenger screening status region displays screening information generated by an explosives detection portal and a metal detection portal. In some implementations, a secondary screening status region displays screening information generated by a body scanning system and an enhanced explosives screening system.

50 Claims, 17 Drawing Sheets

OTHER PUBLICATIONS

Metorex Security Products, Inc., Metor 300 technical specification, "Multi–Zone Walk–Through Metal Detector," Metorex Security Products, Inc., Ewing, NJ.

Rapiscan Security Products, Inc., Rapiscan 520B technical specification, Rapiscan Security Products, Inc., Hawthorne, CA.

Rapiscan Security Products, Inc., Secure 1000 technical specification, Rapiscan Security Products, Inc., Hawthorne, CA.

GE Interlogix, Entry Scan product description, GE Interlogix, website publication www.geindustrial.com.

GE Interlogix, Itemizer product description, GE Interlogix, website publication www.geindustrial.com.

* cited by examiner

242

| ATSC Checkpoint | Primary Bag Screening | Secondary Bag Screening |
|---|---|---|
| Passenger Information<br>Name M. Anderson<br>Flight TJA-731<br>Other 1<br>Other 2<br>Other 3 | ESS [ PASS ]<br><br>X-Ray [ PASS ] | Explosives [ PASS ]<br><br>Bottle [ PASS ] |
| Threat Assessment<br>          Level<br>PAX Threat  3<br>Primary     4<br>Secondary  5<br><br>Overall      5<br><br>Action Recommended<br>[ REJECT ] | Primary PAX Screening<br>Explosives [ PASS ]<br>Self-Divest [ REJECT ]<br>Metal [ REJECT ] | Secondary PAX Screening<br>Body Scan [ REJECT ] |

FIG. 11

COMBINED SYSTEMS USER INTERFACE FOR CENTRALIZED MONITORING OF A SCREENING CHECKPOINT FOR PASSENGERS AND BAGGAGE

FIELD OF THE INVENTION

The present invention relates generally to a combined systems user interface, and in particular to a user interface providing centralized monitoring of a weapons and explosives, multi-layered screening system.

DESCRIPTION OF THE RELATED ART

A variety of detection and screening systems have been developed. Some systems are designed to detect explosives, weapons, and other contraband items. Traditional explosives detection systems include those that are intended to screen individuals, while other systems are designed to screen baggage, luggage, and other items. Similarly, existing weapons detection systems utilize various scanning methods to screen individuals and variously sized containers for weapons, improvised explosives devices (IEDs), and other threat objects.

Checkpoint screening systems have been implemented in a variety of different applications including airports, seaports, public buildings, public transportation facilities, prisons, hospitals, power plants, office buildings, hotels, and casinos, among others. Many existing checkpoint screening systems employ a limited assortment of screening devices. For example, airport screening checkpoints often include weapons and metal detection systems, but do not routinely utilize explosives detection systems. Explosives screening has become increasingly more important, resulting in the implementation of explosives detection devices in some checkpoints. Lack of communication and centralized monitoring among various detection devices is a common problem encountered by existing checkpoint screening personnel at such screening system installations.

While there have been some attempts to create a more comprehensive and reliable checkpoint screening system, these attempts have not been entirely successful.

SUMMARY OF THE INVENTION

A combined systems user interface (CUI) may be configured with an advanced technology screening checkpoint (ATSC), which is a passenger-friendly, high performance system for screening passengers and carry-on items to detect assembled bombs, bomb components, metallic and non-metallic weapons, and other contraband items. In accordance with the invention, the CUI may include a baggage, passenger, and secondary screening status regions. The baggage screening status region displays screening information generated by an explosives screening system and a baggage imaging system, while the passenger screening status region displays screening information generated by an explosives detection portal and a metal detection portal. In some implementations, a secondary screening status region displays screening information generated by a body scanning system and an enhanced explosives screening system.

In accordance with one aspect of the present invention, the baggage screening status region may display screening information generated by a nuclear detection system adapted to detect threshold levels of radioactive materials present in screened baggage.

In another aspect of the present invention, the passenger screening status region may also display screening information generated by a self-divestment portal configured within the passenger screening zone. The passenger screening status region may additionally display images of an individual passenger and a location of metallic items detected on the individual passenger. These images may be generated using a camera working in cooperation with the self-divestment portal.

In accordance with another aspect of the present invention, the CUI may also include screening system control capabilities so that screening sensitivity levels of at least one screening system of the baggage, passenger, and secondary screening zones can be modified. The sensitivity level modifications may be performed manually by a human operator, or automatically modified in response to threat level data provided by a passenger threat level identification system.

In another aspect of the invention, the CUI may also be used to control an entry or exit gate so that passenger flow into and out of the screening checkpoint system may be selectively moderated.

In yet another aspect of the present invention, the CUI may be proximately, or remotely, located to the various screening systems of the ATSC.

BRIEF DESCRIPTION OF THE DRAWING

The above and other aspects, features and advantages of the present invention will become more apparent upon consideration of the following description of preferred embodiments taken in conjunction with the accompanying drawing, wherein:

FIG. 11 is a diagram showing one implementation of a combined user interface (CUI) in accordance with the invention;

DETAILED DESCRIPTION OF THE PREFERRED EMBODIMENTS

In the following description of the preferred embodiments, reference is made to the accompanying drawing, which form a part hereof, and which show by way of illustration, specific embodiments of the invention. It is to be understood by those of ordinary skill in this technological field that other embodiments may be utilized, and structural, electrical, as well as procedural changes may be made without materially departing from the scope of the present invention.

As a matter of convenience, many embodiments of the invention will be described in the context of a checkpoint screening system implemented as part of a typical airport passenger security system. Particular reference will be made to a "passenger" having carry-on "baggage" which is screened for explosives, weapons, and other threat objects. However, it is to be understood that the illustrated embodiments of the invention are not so limited and that many other applications are envisioned and possible within the teachings of this invention. Examples of particular applications of checkpoint screening systems that may also be implemented include seaports, public buildings, public transportation facilities, prisons, hospitals, power plants, office buildings, hotels, and casinos, among others.

Figure 1:
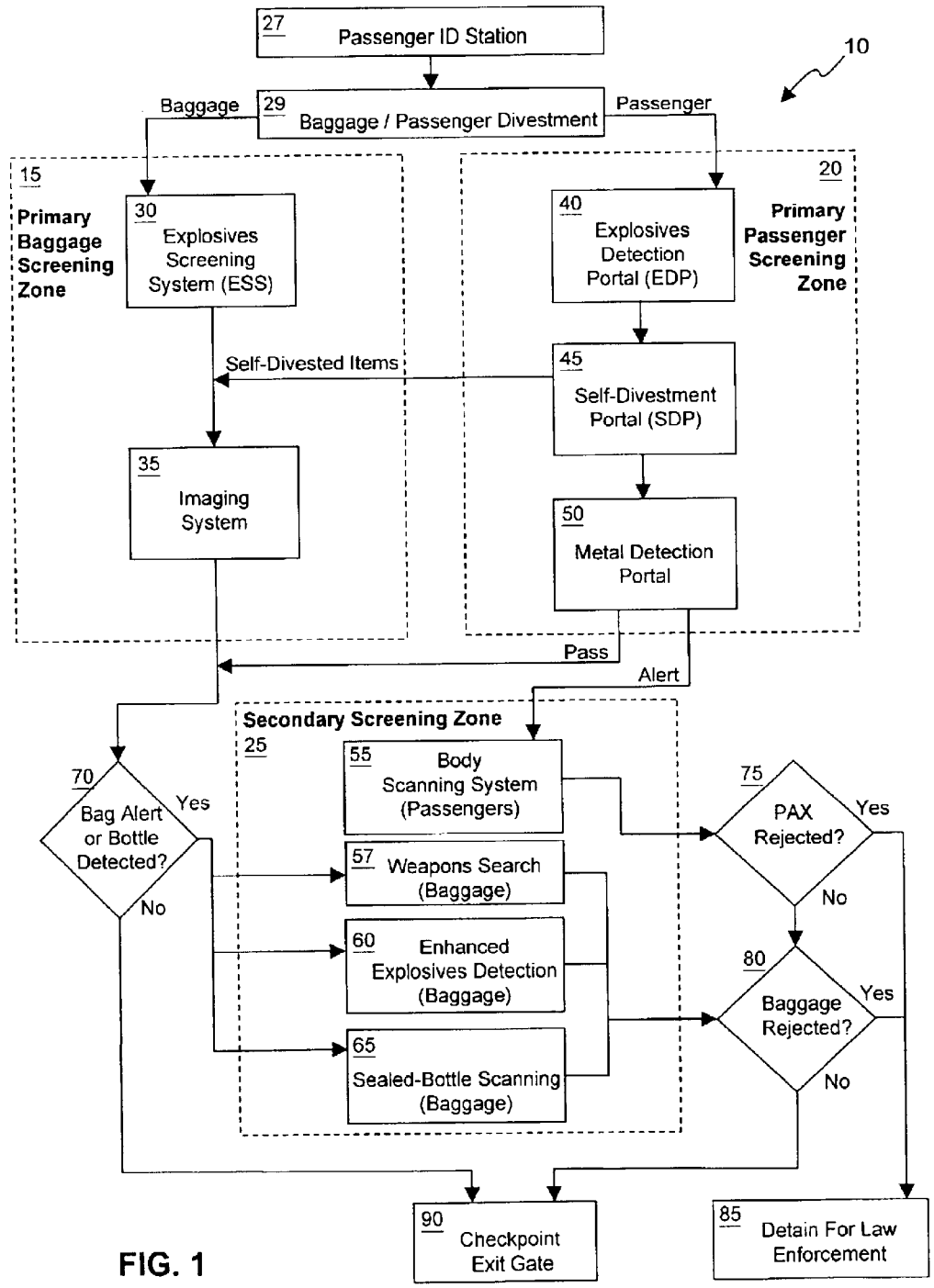
FIG. 1 is a block diagram of one embodiment of an advanced technology screening checkpoint of the present invention.

Referring now to FIG. 1, a block diagram of one embodiment of an advanced technology screening checkpoint 10 of the present invention is shown. Checkpoint 10 generally includes primary baggage screening zone 15, primary passenger screening zone 20, and optional secondary screening zone 25.

In general, the primary baggage and passenger screening zones may be configured with appropriate systems for detecting explosives, weapons, and other contraband. For example, the baggage screening zone may be configured with explosives screening system 30 and imaging system 35, while the passenger screening zone may include explosives detection portal 40, self-divestment portal 45, and metal detection portal 50.

A layered approach to checkpoint security may be augmented by implementing more sophisticated explosives and contraband detection systems within secondary screening zone 25. For example, the secondary screening zone may be outfitted with body scanning system 55 providing enhanced detection of concealed contraband in a passenger's possession. Other systems that may be implemented include weapons search routine 57, enhanced explosives detection system 60 and sealed-bottle scanning system 65.

The weapons search routine may include a manual hand search of suspicious baggage by checkpoint operators. During a typical manual had search, the operators would look for metallic threat objects and other contraband. Information generated by the baggage screening systems may also be used to facilitate this search routine. If desired, some or all of the weapons search routine may be performed with a suitable system, such an enhanced version of the baggage imaging system.

Explosives detection system 60 is useful in the detection of trace amounts of explosives present on passenger baggage, clothing, shoes, portable electronic devices, and the like. Similarly, the sealed-bottle scanning system may be implemented to detect the presence of explosives and other harmful substances within sealed bottles or other containers.

The screening checkpoint is shown optionally configured with passenger ID station 27. The passenger ID station may be implemented using known passenger ID systems. A suitable ID station may be configured to identify passengers by scanning, for example, a passenger's driver license, a state-issued identification card, an RF ID tag, or a boarding pass, among others. Alternatively or additionally, the passenger ID system may configured with biometric identification capabilities using conventional techniques such as retinal scanning, fingerprinting, face identification, and the like. Passenger information acquired by the passenger ID station may be communicated to a control computer.

In some instances, the passenger ID station may operate in conjunction with an optional entry gate to modulate passenger access into the screening portions of the checkpoint. The entry gate may operate under the control of a control computer or a checkpoint operator, and can be implemented using any of a variety of controllable barrier devices such as turnstiles, and swing, sliding or pivoting gate mechanisms.

A generalized example of passenger screening, utilizing a multi-layered screening approach, will now be described. Initially, the passenger may present the appropriate documentation to passenger ID station 27. After scanning, the passenger information may be communicated to a control computer as the passenger proceeds to the baggage divestment station (block 29). The divestment station may be implemented at or near the entry to the baggage screening zone.

Passengers may be required to divest items such as carry-on luggage, laptop computers, portable electronic devices, and contents of their pockets, jackets, or purses, and the like. Other items that a passenger may be required to surrender at the divestment stations include keys, loose coins, wallets, pocket contents, back packs, sport bags, purses, shoes, and jackets. Typically, passengers are provided with one or more bins or trays so that surrendered belongings can be conveniently screened by the assorted baggage screening systems. To optimize the integrity of the screening process, passengers are not permitted to retrieve, any baggage item surrendered at the divestment point until both the passenger and baggage have cleared the required screening zones.

As depicted in FIG. 1, baggage may be passed through explosives screening system 30 and imaging system 35. An alert or pass indication may be generated based upon the existence or absence of explosives, weapons, or other contraband associated with the baggage.

Placement of the explosives detection and imaging systems relative to one another is not critical to many embodiments. However, optimal baggage screening effectiveness may be achieved by configuring baggage screening zone 15 in such a manner that passenger baggage is first screened by the explosives detection system, prior to screening by the imaging system. Explosives screening system 30 may also be configured to communicate information pertaining to the presence or absence of explosives of a particular baggage item to the imaging system operator. With this knowledge, the imaging screening operator may screen the baggage item with more scrutiny.

For example, if explosives screening system 30 communicates an alert (indicating the possible presence of explosives), then the imaging system operator may examine the identified baggage with a particular focus on common or probable explosives threat objects. A particular example may be where an alerted imaging system operator may carefully scrutinize the suspicious baggage for sheet explosives, which typically comprise a thickness as small as one-quarter inch. On the other hand, if the explosives screening system communicates a "pass" (indicating the absence of explosives), then the imaging system operator may examine the identified baggage with a particular or enhanced focus on non-explosives type threat objects such as weapons or other contraband.

Referring still to FIG. 1, passengers may be directed through one or more screening portals comprising passenger screening zone 20. Similar to the baggage screening zone, some or all of the portals of the passenger screening zone may be configured to provide an alert or pass indication based upon the existence or absence of explosives, weapons, or other contraband detected during passenger screening. The alert or pass indication generated by each subsystem of the baggage and passenger screening zones may be generated automatically, via human operator, or both.

Similar to the screening systems of baggage screening zone 15, the relative placement of the screening portals of passenger screening zone 20 is not critical to many embodiments of the invention. However, optimal passenger screening may be achieved by configuring the passenger screening zone in such a manner that the passenger is sequentially screened by explosives detection portal 40, self-divestment portal 45, and then metal detection portal 50. In this particular configuration, the passenger may be shown what to divest (self-divestment portal 45) prior to screening by metal detection portal 50. Use of the self-divestment portal typically reduces the number of alarms triggered by portal 50, consequently reducing the number of passengers who require screening at the secondary screening zone 25.

To further enhance the effectiveness of passenger screening, body scanning system 55 may be configured to scan passengers after they have passed through the primary screening zone. For example, in many implementations, data obtained from one or more screening portals of the passenger screening zone may be communicated to a body scanning system operator. As will be described in more detail herein, data may include, for example, the presence of explosives (portal 40), the presence and location of concealed metal objects (portal 45), or the presence and generalized location of remaining metal, possibly including weapons, on a passenger (portal 50). Using this information, the body scanning system operator may perform more focused and efficient screening of passengers since threat locations, and in some instances, threat types (explosives or weapons), have been identified. If desired, a body search performed by checkpoint operators may be utilized as an alternative to the body scanning system.

Typically, passengers are directed through the screening portals of passenger screening zone 20 contemporaneously with the screening of their baggage. However, baggage screening may be conducted prior to or after passenger screening, if so desired.

At this stage of passenger and baggage screening, three primary scenarios may exist. First, the screened passenger and baggage may have successfully passed all required screening processes. A second generalized scenario may be where either the passenger or baggage has failed one or more screening systems. A third generalized scenario may be where both the passenger and baggage have failed some portion of their respective screening processes. As will be described in more detail herein, the success or failure of the passenger and baggage to meet specific screening requirements may be communicated to a centralized control computer. The terms "alert" and "pass" will be used herein to refer to the success or failure of passengers or baggage to meet specific screening requirements.

For example, a passenger who has been given a pass indication by each of the screening systems is indicative of a passenger that does not posses any detected weapons or contraband items and may be permitted access to a secured area protected by the checkpoint system. In this situation, the passenger may be permitted to retrieve any cleared baggage and allowed to exit the checkpoint (block 90).

On the other hand, if the passenger has triggered an alert, then additional screening may be required at body scanning system 55. Similarly, if the baggage has triggered an alert, or a sealed bottle or container has been detected during the primary baggage explosives and weapons screening process, the suspicious baggage may undergo further screening processes (block 70). In particular, the suspicious baggage may be subjected to additional screening at enhanced explosives detection system 60, or weapons search routine 57, or both. If applicable, sealed-bottles or other containers may be submitted to sealed-bottle scanning system 65.

In the event the passenger has triggered an alert during the primary explosives and weapons screening process (zone 20), or during the body scanning system screening (block 55 in zone 25), the passenger and associated baggage may not be permitted to exit or pass through the checkpoint. In this type of situation, the suspicious passenger may be detained and any associated baggage turned over to law enforcement for further investigation (blocks 75, 85).

Similarly, if an alert is triggered during the baggage or sealed bottle screening processes within the secondary screening zone, the passenger and associated baggage may not be permitted to exit or pass through the checkpoint (blocks 80, 85). However, if the passenger and baggage successfully pass the primary and secondary screening processes, the passenger may be permitted to retrieve any baggage and allowed to exit the screening checkpoint (block 90).

It is to be understood that decision logic for determining whether a passenger or baggage will undergo secondary screening, and in some cases turned over to law enforcement, may be accomplished with the aid of a control computer and a combined user interface (CUI). These aspects will be described in more detail with respect to later figures.

Figure 2:
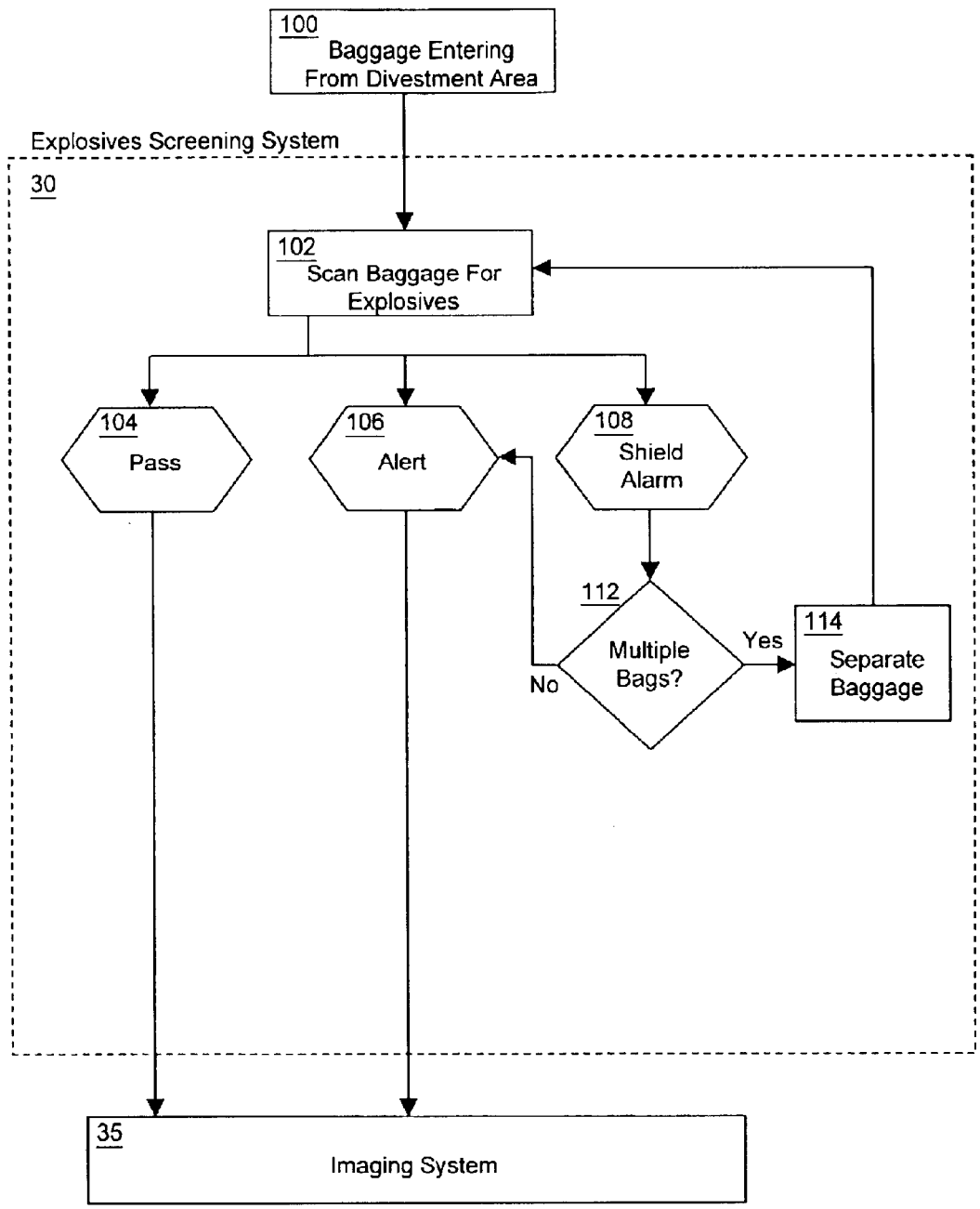
FIG. 2 is a block diagram showing a more detailed view of an example of the explosives screening system in accordance with the invention.

FIG. 2 is a block diagram showing a more detailed view of baggage explosives screening system (ESS) 30 in accordance with some embodiments of the invention. ESS 30 may be implemented using any of a variety of commercially available systems configured to detect the presence of explosives in passenger baggage. An appropriately configured ESS can detect explosives such as Semtex, C-4, nitroglycerin, PETN, RDX, Detasheet, TNT, tetryl, ANFO, black powder, and the like. If desired, the ESS may be easily configured with additional screening capabilities for detecting illegal drugs such as cocaine, heroin, and MDMA, among others.

In some implementations, the ESS may be configured with a nuclear quadrupole resonance (NQR) detector system. NQR is a branch of radio frequency spectroscopy that has been used for the detection of explosives and drugs. NQR exploits the inherent electrical properties of atomic nuclei. Nuclei with non-spherical electric charge distributions possess electric quadrupole moments. In solid materials, electrons and atomic nuclei produce electric field gradients. These electric field gradients interact with the nuclear quadrupole moments of quadrupolar nuclei, producing energy levels for the quadrupolar nuclei, and hence their characteristic transition frequencies. Measurements of these frequencies, or relaxation time constants, or both, can indicate not only which nuclei are present but also their chemical environment.

In operation, using carefully tuned pulses of low intensity radiation waves, quadrupole resonance probes the molecular structure of targeted items such as explosives and narcotics. The quadruple resonance momentarily disturbs the alignment of target nuclei within the item scanned. As the nuclei realign themselves, they emit a characteristic signal of their own, which is picked up by a receiver and sent to a computer for rapid analysis. The signal emitted by each type of explosive or illegal drug is unique. Specialized radio frequency pulse sequences have been developed for optimal detection of particular explosives and illegal drugs such as cocaine and heroin. The QScan QR 160 detection system, developed by Quantum Magnetics, Inc., of San Diego, Calif., is one such system that may be used for implementing ESS 30.

Referring still to FIG. 2, as depicted in block 100, baggage enters the ESS from the baggage divestment area. The baggage may then undergo a scanning process to determine the existence or absence of explosives (block 102). After scanning, the system typically indicates one of three different conditions; pass, alert, or a shield alarm (blocks 104, 106, 108). A pass condition indicates that no explosives have been detected on or within the scanned baggage; an alert condition indicates explosives have been detected; and a shield alarm means the scanned baggage contains material that prevents the scanning system from appropriately interrogating the baggage (block 108).

If the baggage is given a pass indication, it is typically directed to imaging system 35 for additional screening. On the other hand, if the baggage triggers an alert, the existence of the alert will typically be communicated to the operator of the imaging system so that the suspicious baggage may be scanned with particular scrutiny.

If a shield alarm is detected, and the scanned baggage includes two or more separate bags or articles, then the items may be separated and each item can be passed through the ESS for additional scanning (blocks 112, 114). On the other hand, if there is only a single baggage item, an alert may be triggered and the baggage is passed on to the imaging system for further screening.

In many embodiments, ESS 30 does not require human interpretation or analysis in determining a shield alarm or the existence (alert) or absence (pass) of explosives. Automatically providing screening status of baggage (pass, alert, and shield), without the need of human intervention or interpretation, enhances baggage scanning throughput and minimizes human error. Alternatively or additionally, the ESS may be equipped with override capabilities that provide human operators with an ability to change these automatic determinations.

Figure 3:
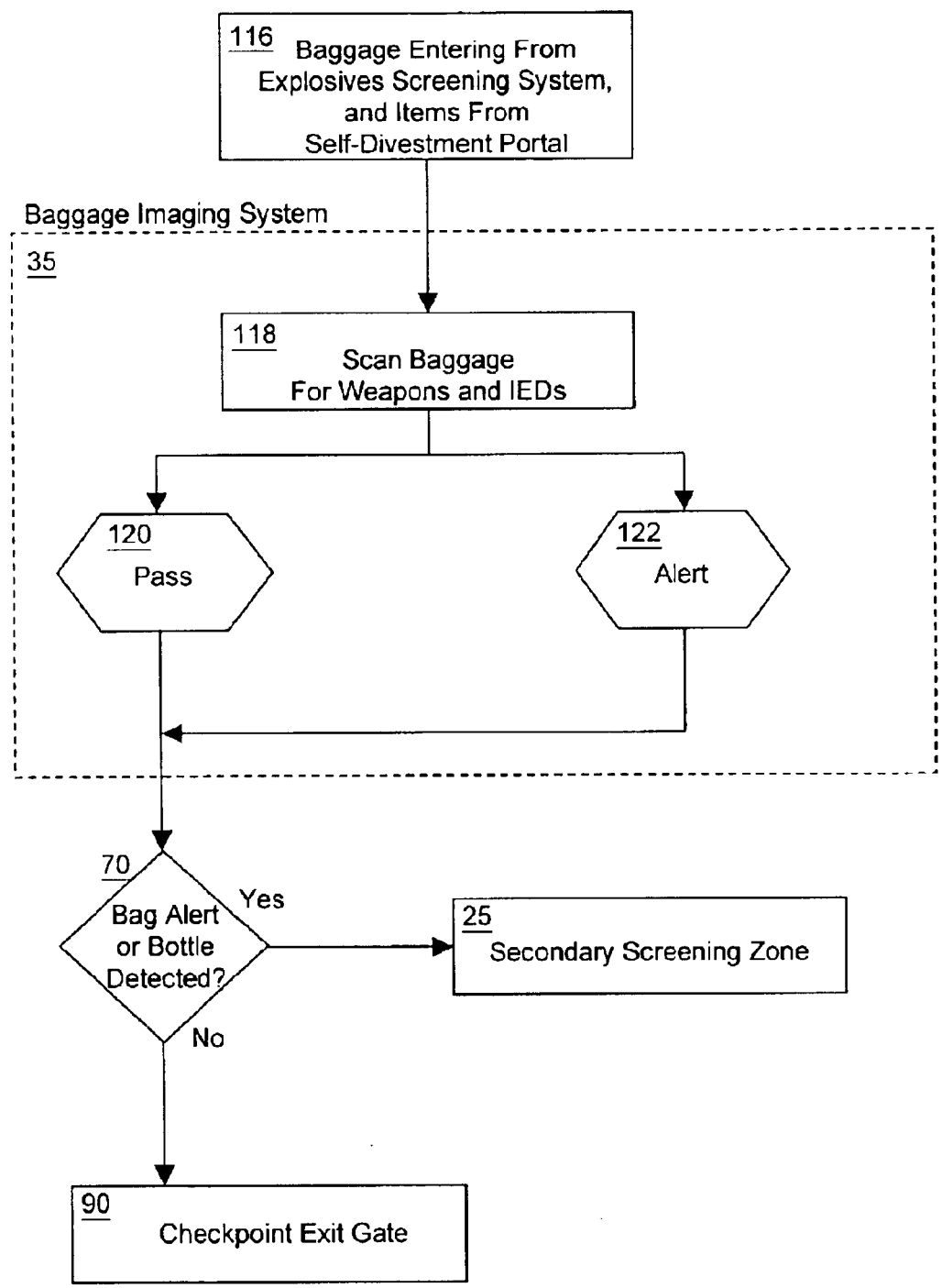
FIG. 3 is a block diagram of a more detailed view of an example of the imaging system in accordance with the invention.

Referring now to FIG. 3, a block diagram of a more detailed view of baggage imaging system 35 in accordance with some embodiments of the invention is shown. The baggage imaging system may be constructed using known imaging technologies. Suitable imaging technologies include, for example, X-ray, computed tomography (CT), magnetic resonance imaging (MRI), smart X-ray, multi-view X-ray, laminography, and the like. Accordingly, imaging system 35 may be implemented using almost any technology that can image the contents of baggage or identify threat objects within baggage, or both. In some instances, it may be desirable to configure the imaging system with automatic threat identification capabilities.

Although no particular size, configuration, or baggage scanning rate is required, a suitable imaging system would be of sufficient size and speed to meet the screening demands of a particular implementation of the invention. For example, in high traffic applications such as airport security checkpoints, the system should accommodate scanning of typical-sized passenger carry-on baggage. The imaging system should also have a baggage scanning rate that does not cause undue passenger delay. Components of a typical imaging system include: a scanning tunnel; a conveyor or other means for passing baggage through the scanning tunnel; and a display device for rendering computer generated images of scanned baggage. Additional features that may be implemented, if desired, include color video, inverse video, variable density zoom, variable color stripping, black and white viewing, manual and automatic image archiving, digital video or picture output, remote workstation capabilities, threat image enhancement and identification, automated pass or reject, and the like. An example of a suitable imaging system 35 includes the Rapiscan 520 X-ray screening system marketed by OSI/Rapiscan Security Products of Hawthorne, Calif.

In operation, as depicted in block 116, baggage enters the imaging system after scanning has been completed by the ESS. In some instances, passenger divested baggage items may be received from passenger screening zone 20.

Upon entering the imaging system, the baggage is scanned for weapons, improvised explosive devices (IEDs), or other contraband (block 118). This is typically accomplished by a human operator examining a generated image of the scanned baggage and making a threat level determination (pass or alert). Items of interest include, for example, the presence of suspicious objects, metallic items, weapons, and bottles or liquid containers that are of sufficient size to contain the threat mass of explosives or other harmful substances.

After reviewing a computer generated image of the scanned baggage, the operator provides either a pass indication or triggers an alert (blocks 120, 122). If the baggage passes this screening process, and no other alerts have been triggered (block 70), then the baggage may be made available for retrieval by the passenger at the checkpoint exit gate (block 90). On the other hand, if the operator identifies a weapon or other suspicious object, for example, an alert will be triggered and the baggage will undergo additional screening in secondary screening zone 25.

Sometimes a bottle or other suspicious container is found in the baggage. In these situations, only the suspicious item is submitted to examination in the secondary screening zone and no further screening of the remaining baggage and passenger is necessary.

Figure 4:
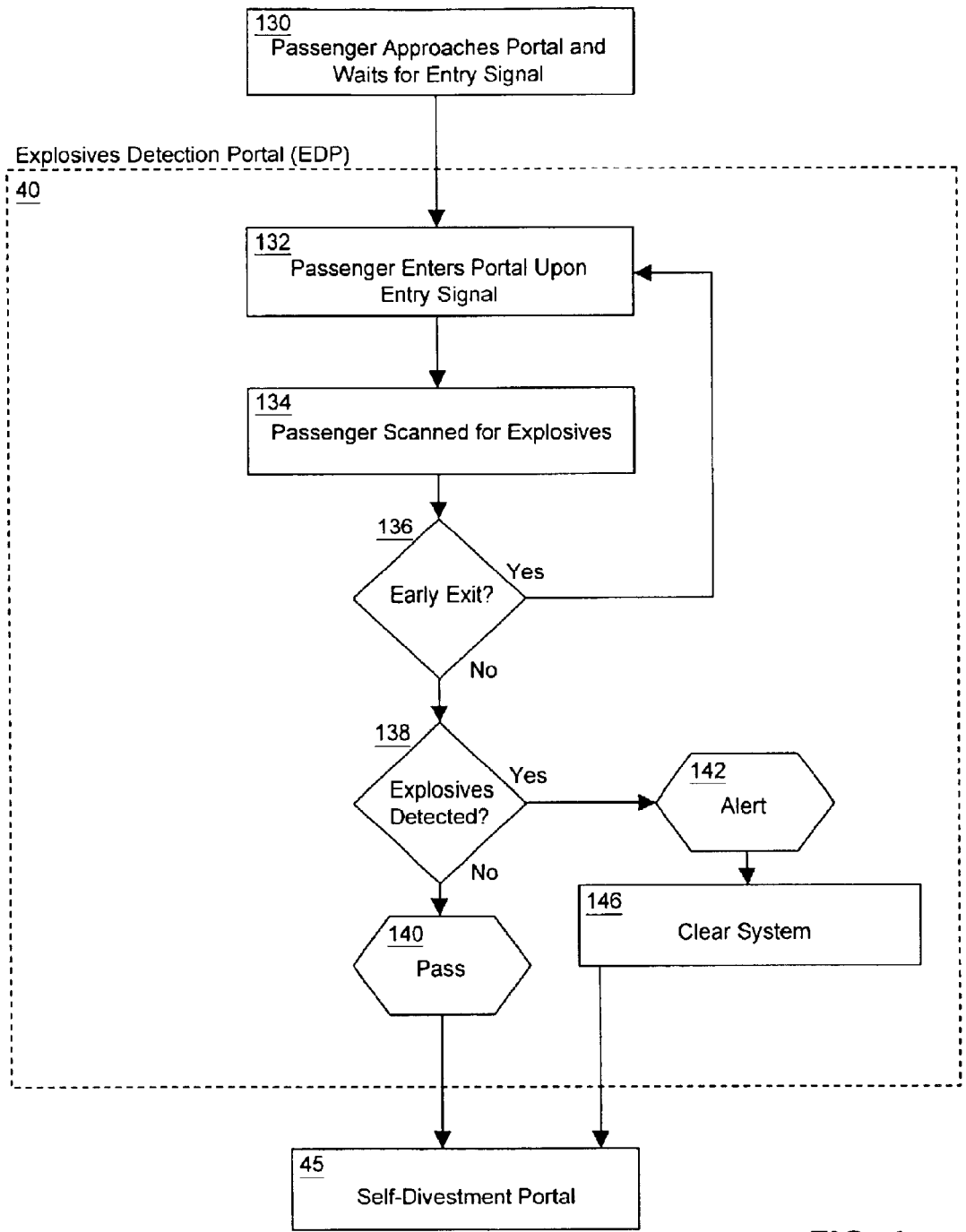
FIG. 4 is a block diagram showing a more detailed view of an example of the explosives detection portal in accordance with the invention.

FIG. 4 is a block diagram showing a more detailed view of passenger explosives detection portal 40 in accordance with some embodiments of the invention. The explosives detection portal may be implemented using conventional technologies that can scan individuals for the presence of explosives. Appropriate systems include trace as well as bulk explosives detection systems (for example, quadruple resonance (QR) systems). Although portal 40 will be described with respect to various types of explosives trace detection systems, other types of explosives detection systems may be used.

Similar to the baggage explosives screening system, passenger portal 40 may be configured to detect an assortment of explosives such as Semtex, C-4, nitroglycerin, PETN, RDX, Detasheet, TNT, tetryl, ANFO, black powder, and the like. If desired, portal 40 may also be configured with detection capabilities for detecting illegal drugs such as cocaine, heroin, MDMA, and the like.

In accordance with some embodiments, screening individual passengers for explosives may be accomplished in the manner set forth in FIG. 4. As depicted in block 130, a passenger first approaches explosives detection portal 40 and waits for an entry signal. An entry signal is often used as a mechanism to control passenger flow through the portal.

In some systems, entry into portal 40 is controlled using passenger ID station 27 (FIG. 1). For example, after a passenger has scanned the appropriate ID card at the passenger ID station and has been divested of baggage, the passenger may be given an entry signal to enter portal 40. Until the passenger has passed through portal 40, the passenger ID station may generate a "busy" notice to waiting passengers. Once the initial passenger has passed through portal 40, for example, the passenger ID station may generate an "enter" notice to the next passenger in line. An entrance gate may be used to moderate the passenger flow through portal 40, and can be implemented to augment or replace the just-described signaling method. One reason for moderating the flow of passengers through the screening process is to facilitate and maintain tracking of passengers and their baggage.

The entry signal may be implemented using visual displays, light indicators, or audio information. For example, the portal may be configured with a visual display that provides "OK to Enter" or "Please Wait" to control passenger flow. Alternatively or additionally, the portal may generate audio messages that signal passengers when entry into the portal is appropriate. In many instances, a human operator is stationed at the portal to assure proper passenger screening.

At the appropriate time, the passenger enters the portal and the scanning process commences (blocks 132, 134). Once inside the portal, vapors and particles from the passenger are collected by the system. For example, some systems collect vapors and particles from the natural flow of air generated by the passenger's body heat. If desired, the portal may be configured with an array of air jets to dislodge particles of interest from passenger's clothing. Regardless of the implementation utilized, the collected air sample may be rapidly analyzed in the detection system for the presence of explosives.

Typical scanning time per passenger ranges from about 5 to 20 seconds. If the passenger exits the portal before the scanning process has been completed, the passenger may be directed to reenter the portal so that the scanning process can be repeated (block 136).

If the system determines that no explosives are present, the passenger is given a pass indication and proceeds to the self-divestment portal for further screening (blocks 140, 45). On the other hand, if the system detects explosives, an alert will be generated by the detection portal (block 142). After the alert indicator is noted, the passenger may be directed to the self-divesting portal and the alert indication cleared from the system so that additional passengers may be screened (blocks 146, 45).

Figure 5:
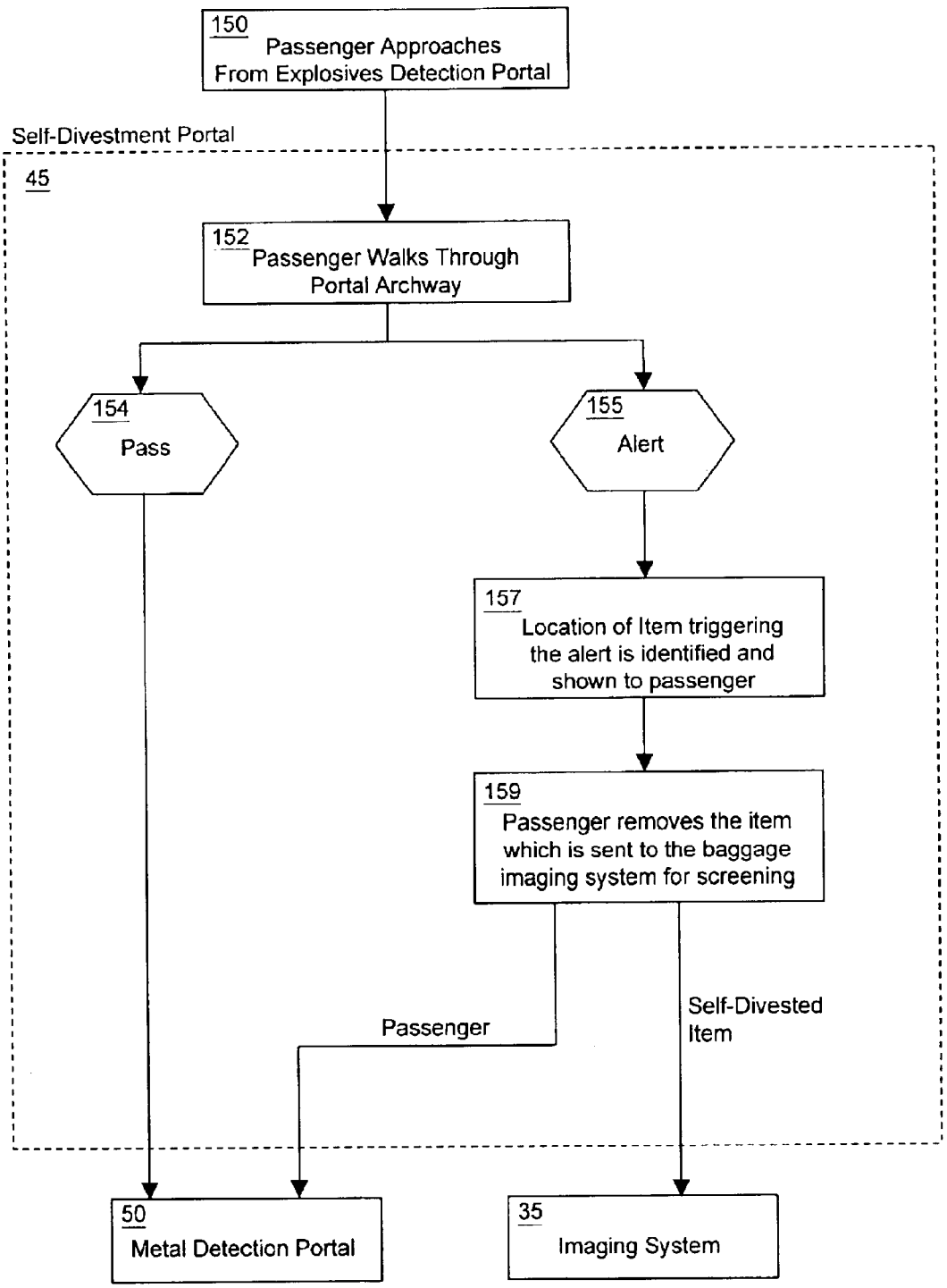
FIG. 5 is a block diagram showing a more detailed view of a self-divestment portal in accordance with some embodiments of the invention.

In accordance with some embodiments of the invention, a block diagram showing a more detailed view of self-divestment portal 45 is depicted in FIG. 5. Portal 45 may be implemented using traditional metal detection systems configured to screen individuals for concealed metal. The self-divestment portal is often implemented as a tool for minimizing the amount of metal in a passenger's possession prior to screening by metal detector detection portal 50. This aspect provides the passenger a final opportunity to give up alarm triggering items prior to screening by portal 50.

In general, components of a typical self-divestment portal include: a portal opening through which passengers pass during screening; a sensitive passive detector array for detecting a variable range of metallic objects; and a device for detecting and displaying to the passenger the location of metallic items on the passenger's person.

In operation, as passengers pass through the portal, the system will determine the presence and location of metallic objects. In one particular system, a camera captures passenger images as they pass through the portal. If a metallic object is detected, the passenger may be presented with an image depicting the passenger and the approximate location of the metallic object that the passenger will need to divest. The image may be a picture, graphics, video, or other indicating device. The i-Portal 100, developed by Quantum Magnetics, Inc., of San Diego, Calif., is one example of a self-divestment system that may be used for implementing portal 45.

FIG. 5 depicts one example of how passengers may be shown what objects need to be divested using portal 45. First, the passenger enters the self-divestment portal and passes through the portal archway (blocks 150, 152). Typically, a system camera captures an image of the passenger as they pass through the archway. If no metal objects are detected, the passenger is given a pass indication and allowed to proceed to the metal detection portal for further screening (blocks 154, 50). However, if the system detects the presence of a metal object, the system indicates an alert 155 and the location of the metal object may be shown to the passenger (block 157). Portal 45 includes both intelligence and imaging capabilities such that the system can not only detect and pinpoint threat locations, but can display the threat location superimposed on the image of the passenger. The threat location may be identified using a flashing dot, for example, on a computer generated passenger image.

The object triggering the alert may be, for example, a wallet chain, unusually large number of metal keys, large belt buckles, watches, jewelry, shoes containing metal shanks or toes, among others. In these instances, the passenger may be directed to remove the object, which is then submitted to imaging system 35 for screening (block 159). In these scenarios, the triggering of an alert does not automatically require that the passenger submit to enhanced screening systems within secondary screening zone 25.

On the other hand, another scenario may be where the passenger or security personnel cannot readily locate the object triggering the alert. In this situation, an alert may be triggered and the passenger directed to the metal detection portal (blocks 163, 50). Because this passenger has triggered an alert, he/she will not be able to exit the checkpoint without undergoing enhanced screening at the secondary screening zone.

Figure 6:
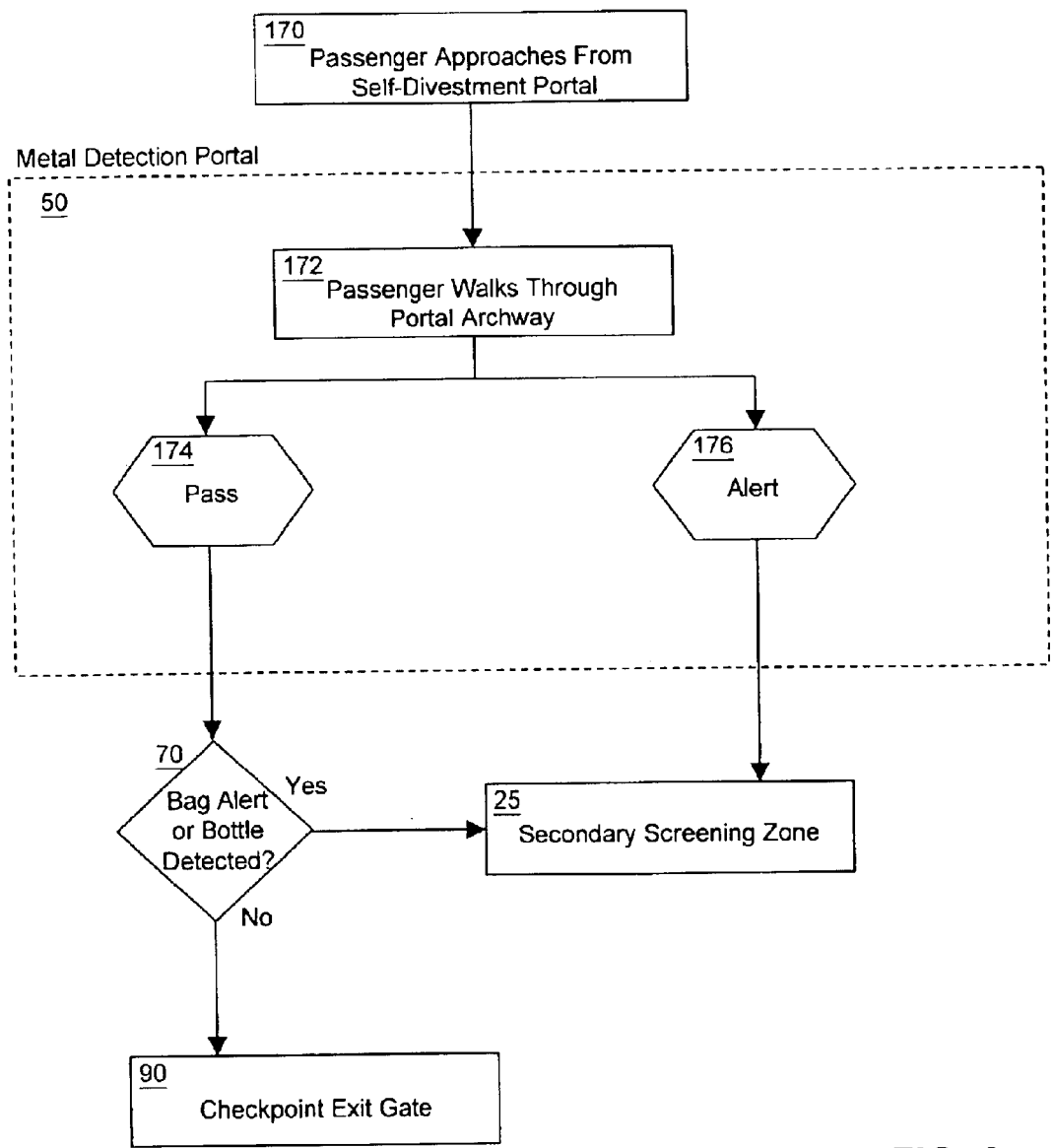
FIG. 6 is a block diagram showing a more detailed view of an example of the metal detection portal in accordance with the invention.

FIG. 6 is a block diagram showing a more detailed view of metal detection portal 50. Almost any suitable walk-through metal detection system may be used for implementing portal 50. By way of non-limiting example, system components of a typical metal detection portal include a portal opening through which passengers pass during screening, and a metal detection system for detecting metal threat objects as well as a variety of other ferrous and non-ferrous metal items. Typically, the metal detection system can detect threat objects regardless of their shape and orientation.

If desired, the metal detection system of portal 50 may include multi-zone metal detectors and associated zone displays that identify regions where the threat object, or objects, are located on the passenger. This feature operates in a similar, but somewhat less precise fashion as the pinpoint threat locator aspect of self-divesting portal 45 (discussed above). A typical multi-zone metal detector may include, for example, two to ten independent detection zones spanning from the bottom to the top of the portal. In operation, the zone display may be used to identify the region where the threat object is detected. Although the invention is not limited to employing any particular type of metal detection unit, examples of suitable detection units that may be used for implementing metal detection portal 50 include the METOR 100, 200 and 300 series metal detectors marketed by Metorex Security Products, Inc., of Ewing, N.J.

An exemplary screening process using the metal detection portal is depicted in FIG. 6. In this figure, the passenger enters the metal detection portal and walks through the portal archway (blocks 170, 172). If no metal threat objects are detected, and no other alerts have been triggered, the passenger is given a pass indication and may proceed to the checkpoint exit gate and retrieve any processed baggage (blocks 70, 90). On the other hand, if the system detects a metal threat object, an alert will be triggered and the passenger is directed to the secondary screening zone for further screening (blocks 70, 25).

Various explosives and weapons screening systems that may be used within baggage and passenger screening zones 15, 20 have been described. As previously stated, many embodiments of the invention include secondary screening zone 25 so that more detailed screening of passengers and baggage may be accomplished, when necessary. Examples of explosives and weapons detection systems that may be implemented within the secondary screening zone will now be described.

Figure 7:
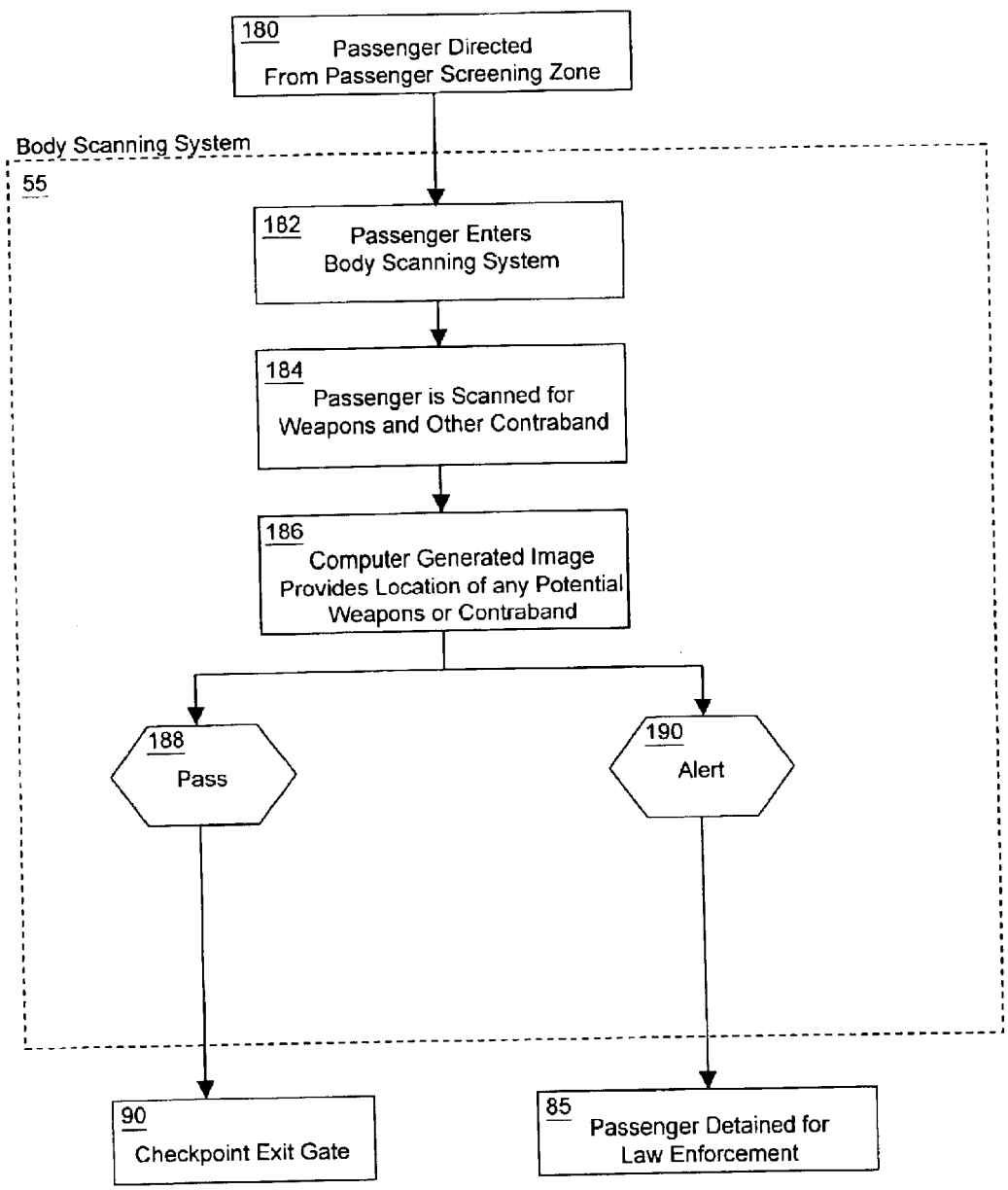
FIG. 7 is a block diagram showing a more detailed view of an example of the body scanning system in accordance with the invention.

FIG. 7 is a block diagram showing a more detailed view of body scanning system 55, which may be implemented using any suitable device capable of detecting and showing the location of metallic and non-metallic objects concealed on or inside a passenger's body. The types of threat objects that may be detected include explosives, explosive devices, firearms, knives, razors, razor blades, glass vials, ceramics, plastic containers, plastic weapons, syringes, packaged narcotics, graphite fibers, bundled paper currency, wooden objects, and other contraband or security threats.

A typical body scanning system includes an X-ray scanning device, sensitive X-ray detectors, and a display device for rendering images. In operation, the X-ray scanning device scans a passenger with a typically narrow beam of X-rays. Some portion of these X-rays will be reflected by the passenger as backscatter in the opposite direction and gathered by the X-ray detectors. The detected backscatter radiation undergoes image processing to produce images of the scanned passenger and any threat objects that may be present. These images may be viewed by an operator on a display device such as an LCD, CRT, or plasma monitor.

Suitable systems for implementing body scanning system 55 include, for example, the Rapiscan Secure 1000 body scanning system marketed by OSI/Rapiscan Security Products of Hawthorne, Calif. Other technologies for implementing the body scanning system include body cavity screening systems, as well as systems utilizing screening technologies such as millimeter wave, terahertz waves, MRI, and the like.

Scanning a passenger using the body scanning system can be accomplished as follows. As depicted in FIG. 7, the passenger enters the body scanning system and faces a front panel containing the X-ray scanning device (blocks 180, 182). A front scan of the passenger may then be obtained (block 184). Next, the passenger turns so that their back is toward the front panel and a back scan is obtained. If desired, additional scans may be conducted on either side of the passenger. Typical scanning time ranges anywhere from 2 to 10 seconds per scan. After the scanning, a computer generated image of the passenger may be presented on an appropriate display revealing any threat objects concealed under or within the passengers clothing (block 186).

If no threat objects are detected, the passenger may be given a pass indication and allowed to proceed to the checkpoint exit gate and retrieve any cleared baggage (block 90). However, if threat objects are detected, an alert can be triggered (block 190) and the passenger may be detained by law enforcement for further investigation (85).

Figure 8:
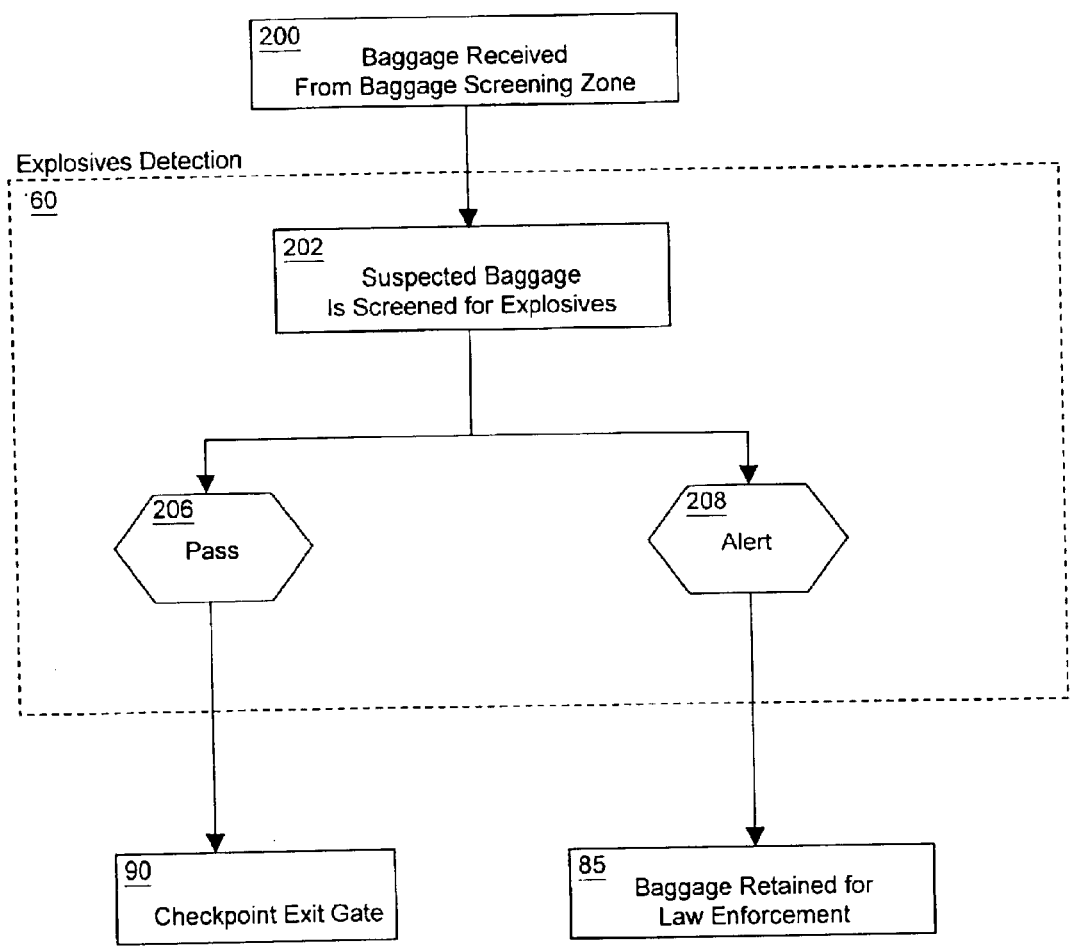
FIG. 8 is a block diagram showing a more detailed view of an explosives detection system in accordance with some embodiments of the invention.

FIG. 8 is a block diagram showing an example of explosives detection performed on suspicious baggage using enhanced explosives detection system 60. The enhanced explosives detection system may be implemented using known explosives detection system capable of detecting explosives such as trace explosives detection, thermal neutron analysis (TNA), QR, CT, and the like.

An explosives detection system implemented as a trace detection system will now be described. Trace detection may be accomplished using known detection technologies, including vapor and particle sampling systems. A suitable detection system is one that is capable of detecting trace amounts of explosives such as Semtex, C-4, nitroglycerin, PETN, RDX, Detasheet, TNT, tetryl, ANFO, black powder, and the like. Available trace detection systems that may be used for implementing system 60 include, for example, the ITEMISER trace detection system marketed by G.E. Ion Track Instruments, of Wilmington, Mass.

In accordance with some embodiments of the invention, trace explosives screening may proceed as follows. After the baggage has been received from baggage screening zone 15, the inside and outside may be wiped with a cloth or swab that is often referred to as a sample trap (block 200). Particular attention may be paid to areas of the baggage likely to have been touched, such as zipper tabs, latches, and handles. After wiping, the sample trap may be placed into the trace detection machine for analysis.

After analyzing the sample trap, the trace detection machine will determine the existence or absence of explosives (block 202). If no explosives are detected, a pass indication will be generated and the baggage can be retrieved by the passenger at the exit gate (90). However, if the sample trap scans positive for explosives, an alert (block 208) will be triggered and the suspicious baggage may be turned over to law enforcement for further investigation (block 85).

Figure 9:
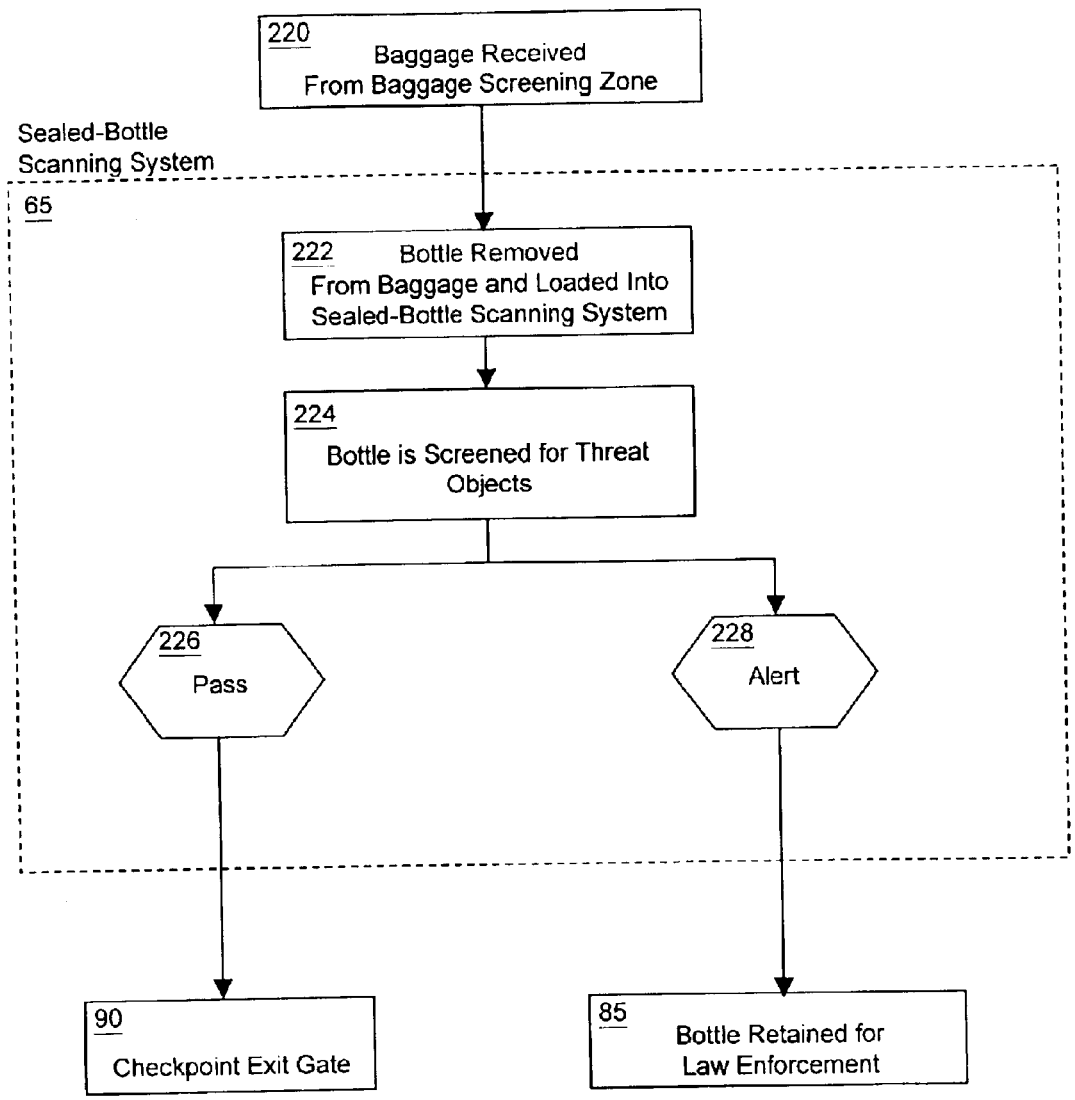
FIG. 9 is a block diagram showing a more detailed view of a sealed-bottle scanning system in accordance with some embodiments of the invention.

FIG. 9 is a block diagram providing an example of how sealed bottles and other containers may be scanned to detect explosives and other harmful substances. Scanning sealed bottles and other containers in accordance with the invention may be accomplished using known container scanning technologies. Suitable scanning systems generally include: a tunnel or analyzing bay for receiving a container for scanning; a scanning system; and a display device for indicating the presence or absence of threat materials. In many implementations, the scanning system is capable of scanning sealed bottles and other containers for the presence of liquid explosives and other harmful substances.

Some systems utilize a form of magnetic resonance to scan suspicions containers. In operation, magnetic resonance techniques use a combination of a magnetic field and specially tuned radio wave pulses to momentarily perturb certain nuclei from their natural orientation within the magnetic field. Certain atomic nuclei possess a magnetic moment; they tend to align themselves if a magnetic field is applied. If a radio frequency pulse of the "correct" frequency is applied to molecules in a magnetic field, the nuclei will absorb the radio energy and realign themselves in a different, more energetic orientation.

At the end of the pulse, the nuclei will revert to their preferred lower-energy orientation over a known time period. This relaxation causes the atoms to emit their own weak radio signal. The relaxation time and frequencies are different for each atom/molecule as they are dependent on the atoms present and the surrounding molecular structure. This allows magnetic resonance to differentiate liquids from one another or to differentiate a liquid from a solid. As a result, the system quickly and very accurately distinguishes between harmless and dangerous bottle contents. One type of sealed-bottle scanning system that may be used for implementing system 65 is the LiquiScan system developed by Quantum Magnetics, Inc., of San Diego, Calif.

Screening sealed bottles and other containers for explosives and other threats, in accordance with some embodiments, may be accomplished in the manner depicted in FIG. 9. For example, after screening has been completed in the baggage screening zone, the suspicious bottle may be removed from the baggage and loaded into the analyzing bay of the sealed-bottle scanning system (blocks 220, 222). The bottle may then be screened for threat objects using, for example, the aforementioned magnetic resonance scanning methods (block 224). If no threat objects are detected, then a pass indication may be generated and the scanned bottle can be retrieved by the passenger at the checkpoint exit gate (blocks 226, 90). However, if the bottle scans positive for explosives or other threats, an alert will be triggered and the bottle presented to law enforcement for further investigation (blocks 228, 85).

Figure 10:
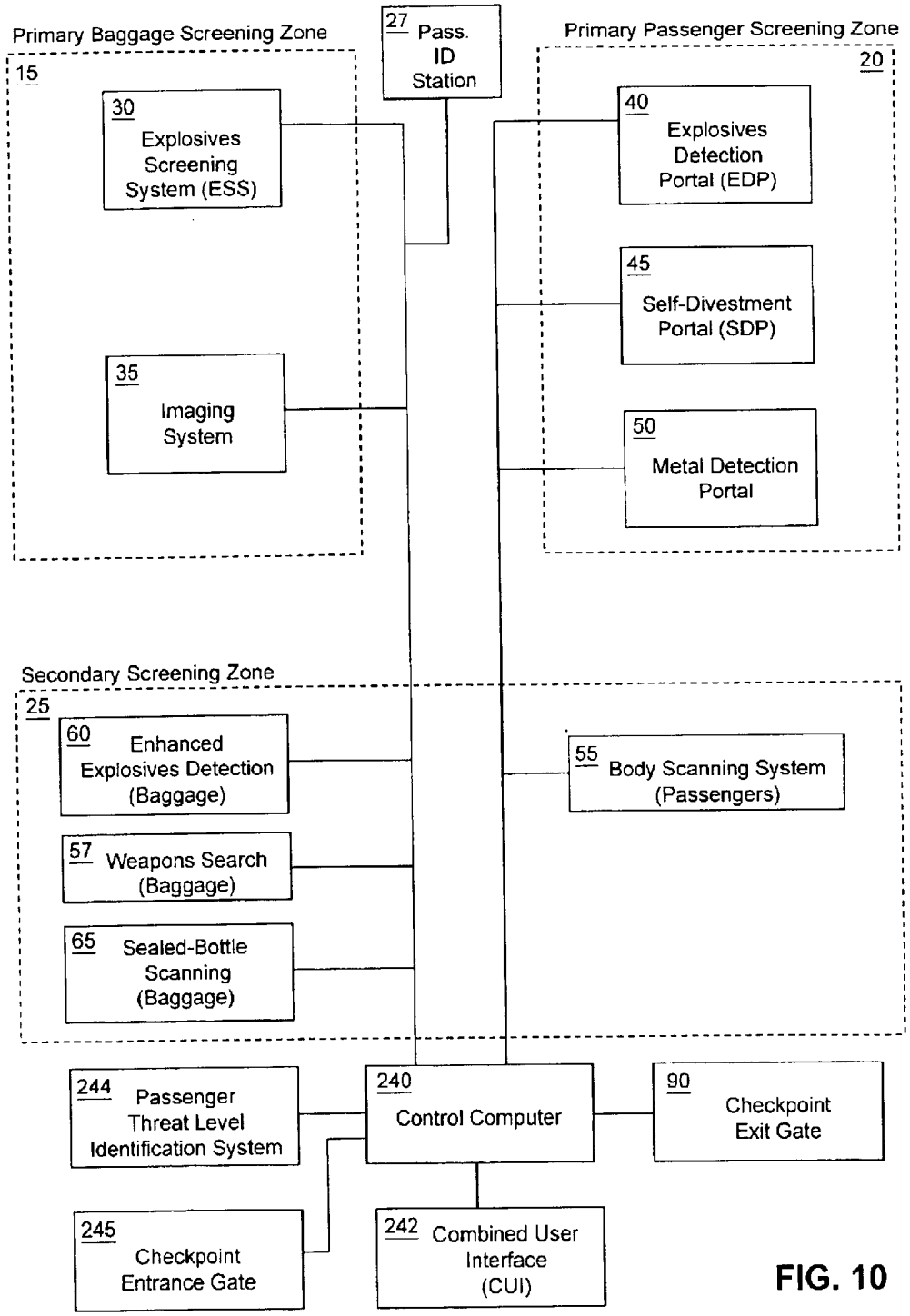
FIG. 10 is a block diagram in accordance with the invention, showing a control computer in communication with individual screening systems of the baggage, passenger, and secondary screening zones.

FIG. 10 is a block diagram showing control computer 240 in communication with individual explosives and weapons detection systems of the baggage, passenger and secondary screening zones. The communication link between these systems may be implemented using any suitable method that supports the transfer of information such as data, video, and image information. In many embodiments, the communication link is implemented using conventional communication technologies such as UTP, Ethernet, coaxial cables, optical fibers, among others. Although the use of wireless communication technologies is possible, they are typically not implemented since they lack the level of security required by many applications such as airport security checkpoints.

The control computer is shown configured with combined user interface (CUI) 242, checkpoint exit gate 90, and optional checkpoint entrance gate 245. The control computer may optionally be interfaced with passenger threat level identification system 244 to further enhance the effectiveness of checkpoint screening. In general, a typical threat identification system provides data that may be used to assign a threat level to particular passengers.

In some embodiments, the threat level identification system comprises passenger data gathered by a passenger pre-screening system. Typical passenger pre-screening systems utilize artificial intelligence software to analyze threat-triggering aspects for a given passenger. Threat-triggering aspects range from how and when airline reservations were made, whether they purchased one-way or round-trip tickets, whether cash or credit was used to purchase the airline ticket, and whether the purchaser or passenger has links to known terrorist or radical groups.

Advanced threat level identification systems are designed to scan multiple public and private databases for information on passengers and other travelers. For example, an advanced system may generate passenger security threat profiles using governmental sources such as the FBI, National Crime Information Center (NCIC), State Department databases, IRS, Social Security Administration, state motor vehicle and corrections departments, credit bureaus, and bank records. The passenger threat level identification system may also include data from a number of private organizations that have generated, for example, preferred passenger lists. Threat level gathering in general, and the specifics of threat level data gathering, are not essential to the invention. If a threat level identification system is employed, the checkpoint system of the invention may be configured to cooperate with almost any threat identification system that provides data that may be used to assign a threat level to passengers.

Control computer 240 may be implemented using any suitable computational device that provides the necessary control and monitoring of the associated explosives, weapons, and passenger identification systems. The control computer may be a specific or general purpose computer such as a personal computer having an operating system such as DOS, Windows, OS/2 or Linux; Macintosh computers; computers having JAVA OS as the operating system; graphical workstations such as the computers of Sun Microsystems and Silicon Graphics, and other computers having some version of the UNIX operating system such as AIX or SOLARIS of Sun Microsystems; or any other known and available operating system, or any device including, but not limited to, laptops and hand-held computers.

CUI 242 may be any suitable display device operable with any of the computing devices described herein. The CUI comprises a suitable display device such as an LCD, CRT, plasma monitor, or the like. In many embodiments, the CUI is implemented as a single display providing a centralized collection of screening data, images, and decisions for individual passengers generated by the respective scanning systems used for passengers and baggage.

FIG. 11 is a diagram showing one implementation of combined user interface (CUI) 242, and will be described in conjunction with the advanced technology screening checkpoint shown in FIG. 1.

In many embodiments, the CUI provides a single, centralized display presenting the screening results, images, and decisions for individual passengers generated by the respective scanning systems used for passenger and baggage screening. The CUI is typically operated by supervisory personnel who are responsible for passenger and baggage screening. If desired, the CUI can receive and display data such as profile information associated with screened passengers. The control computer and CUI may also be interfaced with other systems via networking and remote data transmission and storage systems.

The CUI is shown separated into six general regions. The center section of the CUI comprises the primary baggage and passenger screening status regions, while the right side comprises the secondary baggage and passenger screening status regions. Passenger information may be displayed at the upper left region of the CUI, while threat assessment and screening recommendation may be presented at the lower left region. Each of the six status regions of the CUI is shown being presented on a single display unit, but other embodiments are possible where additional display devices may be implemented. For example, some embodiments utilize three separate display devices such that one display device is dedicated to passenger and threat assessment data, another is dedicated to primary passenger and baggage screening, and a third display device presents secondary passenger and baggage screening data. Other possibilities include providing each of the six status regions with a dedicated display device. It should be understood that six status regions in the CUI is only an example and there could be more or fewer than six, or the regions may be split up, combined, or designated in other ways.

The primary baggage screening status region includes status information relating to the two baggage screening systems, namely, explosives screening system 30 and baggage imaging system 35. When the status indicators associated with each of these systems read "pass," it indicates that the baggage has passed the required screening requirements. In the event the screened baggage failed to meet a particular screening requirement, the appropriate status indicator may read "alert" or "reject." An image of the baggage may also be presented in the primary bag screening region, which enables the checkpoint supervisor or other individuals to view images captured by the baggage imaging system to confirm or overturn the imaging operator's decision.

The primary passenger screening status region is shown having status information relating to the three passenger screening systems, namely, explosives detection portal 40, self-divestment portal 45, and metal detection portal 50. Similar to the primary baggage screening status region, the passenger status region includes status indicators associated with each of these systems. For example, the passenger explosives detection system reads "pass," indicating that the passenger has passed the required screening for this system.

The self-divestment portal reads "reject" indicating that a metal object has been located on the passenger. Typically, the passenger will remove the detected metal object and submit it to the imaging system 35 for screening. Once again, a "reject" indication by the self-divestment portal may, or may not, be used in determining whether or not the passenger is to submit to secondary screening. The metal detection portal reads "reject" indicating that the passenger has failed the screening requirements of these systems. An image of the passenger generated by the self-divestment portal is presented in the passenger screening status region to ensure that follow-on instruction addressed the threat.

Because the passenger triggered an alert during screening, the passenger and baggage are subjected to secondary screening. The secondary baggage status region includes status information relating to two secondary passenger screening systems, specifically, explosives detection system 60 and sealed-bottle scanning system 65. Each of the two secondary baggage screening systems have a "pass" status, indicating the passenger baggage has passed the required screening for these systems.

The secondary passenger screening status region comprises status information relating to body scanning system 55. In this region, the status indicator reads "reject" indicating the passenger has failed the screening requirements for this system. The probable reason for the passenger being rejected is shown in the image of the passenger generated by the body scanning system. In particular, the computer generated image reveals that the passenger is concealing a firearm in the waistband region.

Passenger information that may be displayed at the upper left region of the CUI includes, for example, passenger name and flight number. Additional information may be included as may be required or desired. Passenger information is typically obtained from passenger identification system 27.

The final region of the CUI relates to the threat assessment and screening recommendation for the passenger and associated baggage. The passenger threat assessment region may be sectioned into several categories including a passenger threat level, primary screening level, secondary screening level, and an overall screening level. The primary and secondary threat level categories may be used to indicate passenger and baggage screening performance at the primary and secondary screening zones, respectively. The overall threat assessment indicator is based upon a method that combines passenger threat level assessment, primary and secondary threat levels, and may be used to represent a decisive number for accepting or rejecting a particular passenger.

The passenger threat level assessment indicator may be broken down into three levels; namely, high-risk passenger, unknown passenger, and known passenger. Each of these three levels may be associated with varying sensitivity levels and screening requirements for the passenger and baggage. Upon satisfying these requirements, the system may automatically generate a pass/reject recommendation, which the security supervisor can accept or reject. If the passenger receives a clear or pass indication, then the passenger may be permitted to pass through the screening checkpoint exit gate and enter the secured area. On the other hand, if the passenger is issued a reject recommendation, then the passenger and baggage may be refused entry into the secured area, and in some instances, turned over to law enforcement for investigating. An example of three varying levels of security requirements will now be described.

The highest level of security screening may be applied to what will be referred to herein as high-risk passenger. A high-risk passenger may be a passenger who has been identified by the passenger threat level identification system as being a potential security threat. High-risk passengers may be required to be screened by both the primary and secondary screening systems, regardless of any "pass" indications in the primary screening zones. Alternatively or additionally, one or more of the screening systems of the checkpoint may be set at a higher sensitivity level for screening high-risk passengers. A high-risk passenger may be cleared to pass through the security checkpoint only if all screening systems report a "pass" screening status. Typically, final supervisor approval is required before the high-risk passenger is permitted to pass through the security checkpoint.

An unknown passenger is one who has not been identified as a high-risk passenger, and is otherwise not known to the system. Screening unknown passengers may require the passenger to submit to the primary screening systems, and submission to the secondary screening systems is made only if an alert has been triggered during primary screening. Similar to high-risk passenger screening, one or more of the screening systems of the checkpoint may be set at a higher sensitivity level for screening unknown passengers, if desired. The unknown passenger may be cleared to pass through the security checkpoint after the appropriate screening systems have reported a "pass" screening status. Typically, the checkpoint supervisor is given the ability to override the automatic clear/reject decision.

The lowest level of security requirements may be applied to known passengers who are individuals who may have undergone some amount of pre-screening or who have been identified as less likely to pose a security risk. Because of their lowered security risk, known passengers may be required to submit to primary screening systems that are set at lower sensitivity level. Again, the checkpoint supervisor may be given the ability to override the automatic clear/reject decision.

It is to be realized that the sensitivity levels of one or more of the screening systems of the checkpoint may be automatically adjusted in response to particular threat levels of passengers. Another option is where the checkpoint supervisor is given the ability to manually adjust the sensitivity levels of the screening systems.

Typically, the checkpoint supervisor is provided with a CUI, which may be positioned at or near the checkpoint exit. However, many other configurations are possible and can be implemented without the need of inventive faculty. For example, the CUI may be located at an airport security office which could be located some distance away from the actual checkpoint itself. Alternatively or additionally, the CUI may be located at a regional or national security office that is located hundreds or even thousands of miles away from the actual security checkpoint. Accordingly, remote implementations of the CUI may be realized wherever a secure network connection can be established.

The CUI may be provided with an assortment of features to facilitate or enhance passenger and baggage screening. For example, the CUI operator may have the ability to expand any image to a full screen display with a simple button click. If multiple images are taken, each of the images may be represented on the screen as thumbnail images.

In situations where the passenger and baggage have respectively cleared the primary passenger and baggage screening zones, then the secondary screening status regions may be grayed out since they are not needed. Alternatively, the secondary screening status regions may be omitted, enabling the primary screening status regions to be expanded.

If more than one passenger is currently within the checkpoint system, the CUI display may default to the first passenger. In this scenario, the CUI may provide an operator with the ability to toggle between passengers while data is being collected by the various screening systems. The CUI may also include an archive feature that permits the review of passengers at some later point in time.

Still further possibilities include integration of the security checkpoint within a secured governmental computer network. In this configuration, data obtained during passenger screening may be made available to outside agencies such as law enforcement, immigration, and the like. Another option may be configuring a plurality of CUIs at a single checkpoint to further enhance screening throughput.

Figure 12:
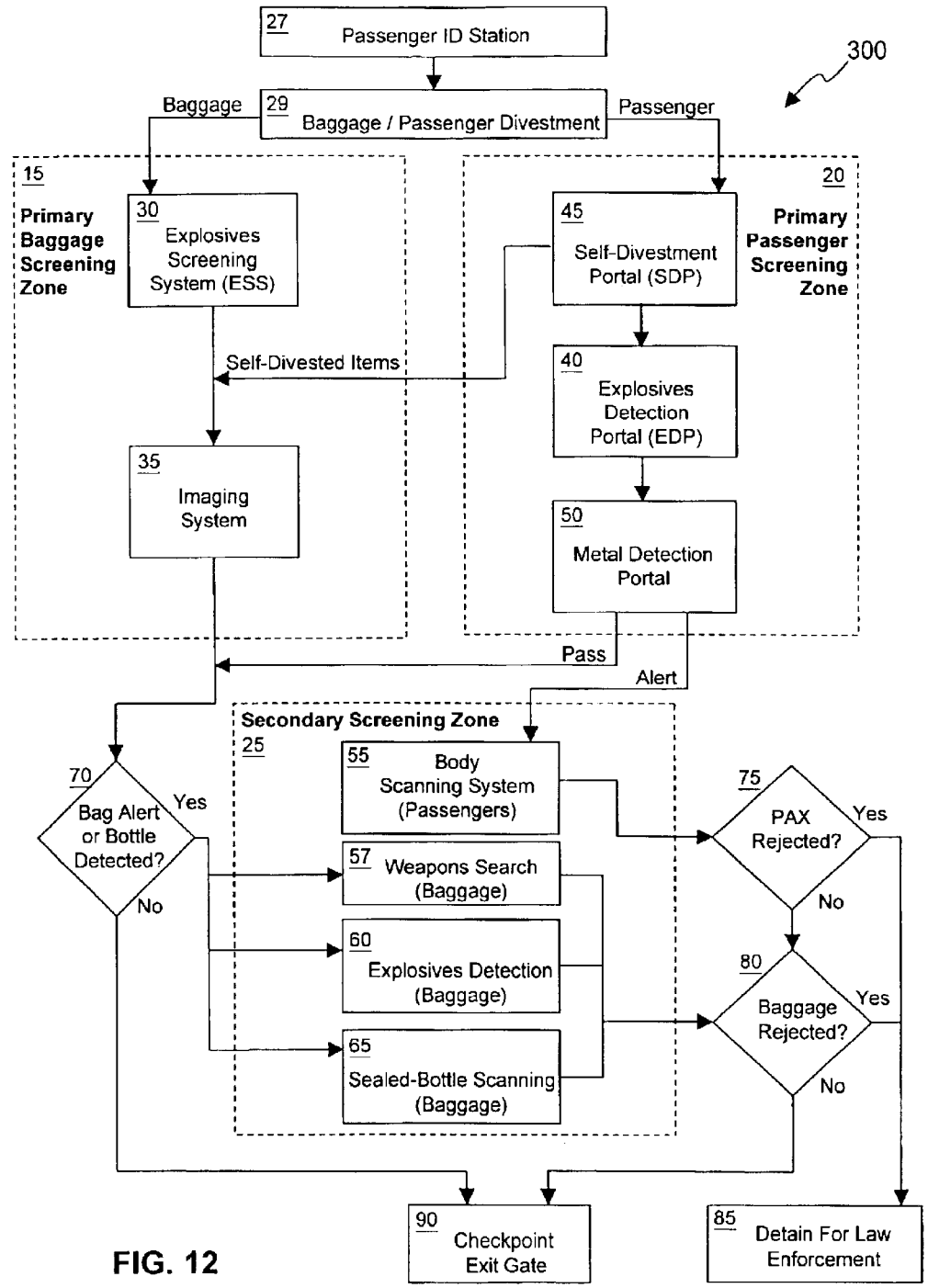
FIG. 12 is a block diagram showing an alternative embodiment of an advanced technology screening checkpoint of the present invention.

Referring now to FIG. 12, a block diagram of an alternative embodiment of an advanced technology screening checkpoint 300 of the present invention is shown. Similar to other embodiments, checkpoint 300 is shown generally including primary baggage screening zone 15, primary passenger screening zone 20 and secondary screening zone 25. A notable distinction relates to the relative placement of the detection portals of passenger screening zone 20. In particular, the passenger screening zone is shown configured in such a manner that the passenger is screened first by self-divestment portal 45, then by explosives detection portal 40, followed by metal detection portal 50.

The checkpoint screening system shown in FIG. 12 illustrates a dynamically configurable system that may be implemented in one or more embodiments. Once again, as described above, optimal passenger and baggage screening may be achieved by particular arrangements of the explosives and weapons detection systems of the baggage, passenger and secondary screening zones 15, 20, 25. However, many embodiments are not so limited and any sequential combination of the particular screening and imaging systems of baggage, passenger and secondary screening zones 15, 20, 25 disclosed herein may be implemented if so desired.

Figure 13:
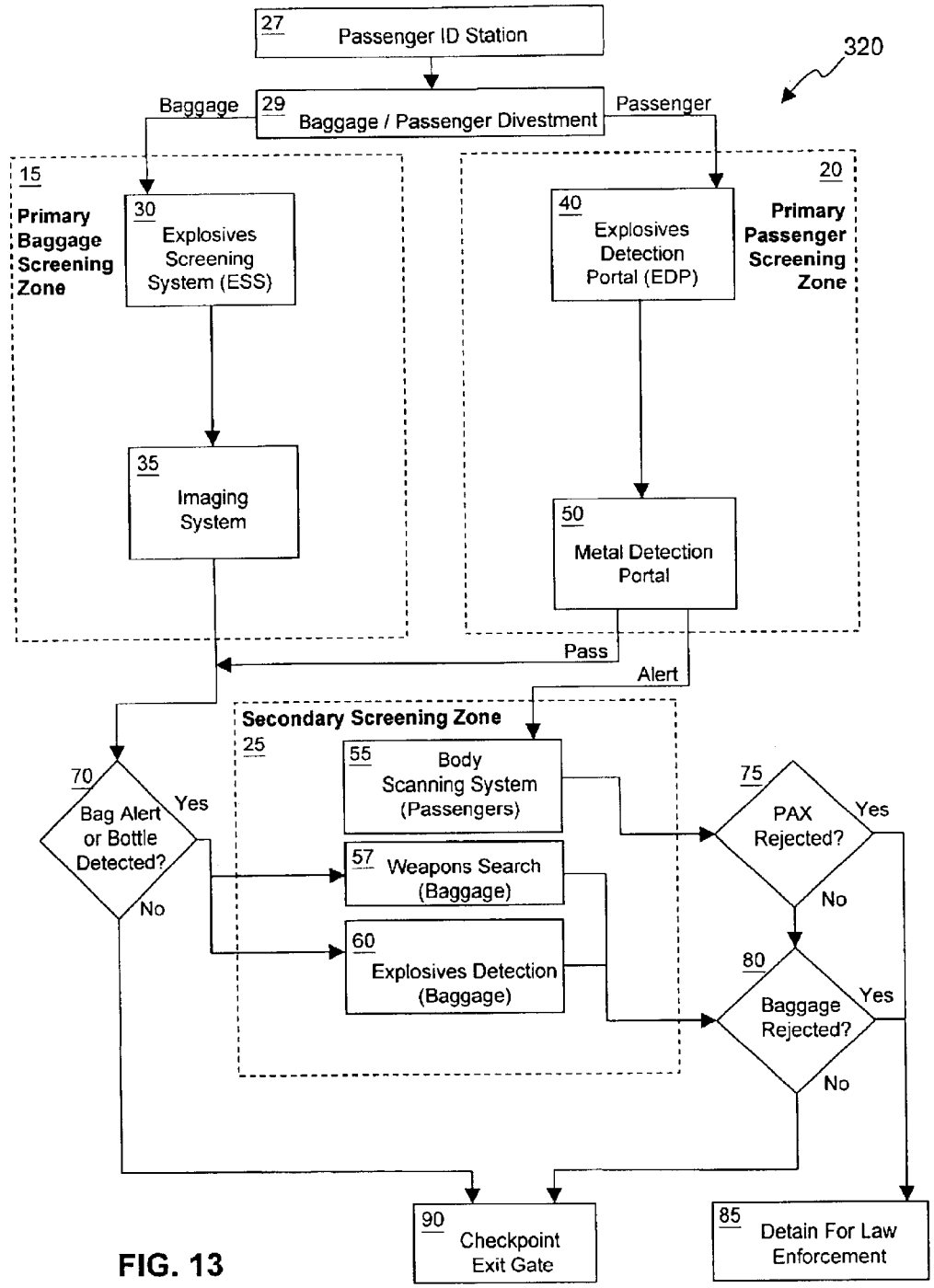
FIG. 13 is a block diagram showing another alternative embodiment of an advanced technology screening checkpoint of the present invention.

For example, FIG. 13 shows another alternative embodiment of an advanced technology screening checkpoint 320 of the present invention. As shown, checkpoint 320 generally includes primary baggage screening zone 15, primary passenger screening zone 20 and secondary screening zone 25. However, in this embodiment, the passenger screening zone includes two screening portals, in contrast to three screening portals illustrated in the other figures. In particular, the passenger screening zone is shown configured with explosives detection portal 40 and metal detection portal 50. FIG. 13 further shows a checkpoint screening system being implemented without the use of a self-divestment portal, passenger ID station, or a sealed-bottle detection system.

Figure 14:
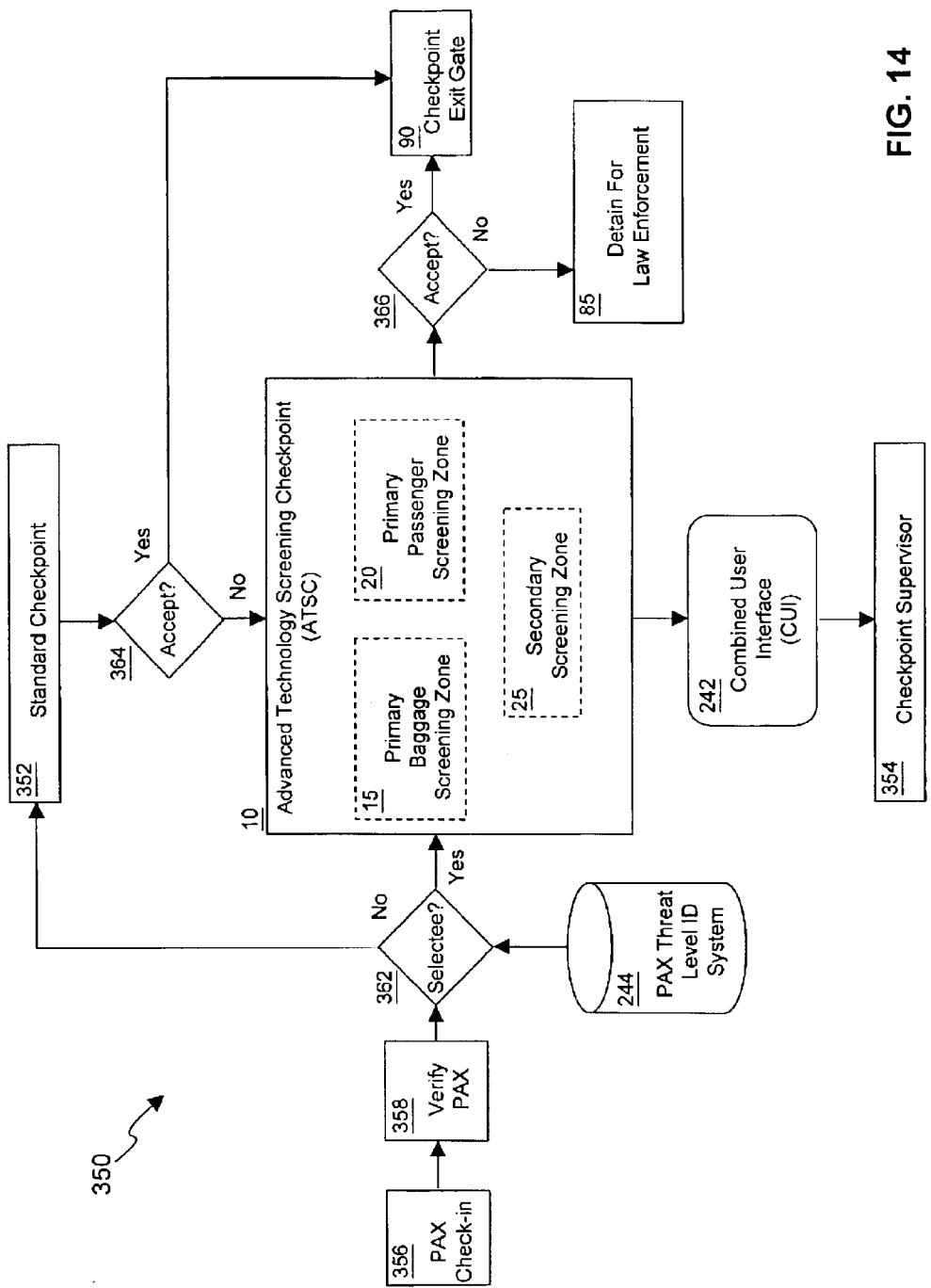
FIG. 14 is a block diagram showing an integrated screening checkpoint in accordance with some embodiments of the present invention.

FIG. 14 is a block diagram of an integrated screening checkpoint in accordance with some embodiments of the present invention. As shown, checkpoint 350 generally includes standard screening checkpoint 352 and advanced technology screening checkpoint (ATSC) 10. One purpose of this implementation is to provide "standard" or "advanced" screening procedures as may be required or desired. For example, passengers may be classified into two primary categories; namely, low-risk or high-risk. High-risk passengers may include those who meet some selection criteria as having a greater likelihood of possessing explosives or weapons. For screening efficiency and effectiveness, it is desirable to subject identified high-risk passengers to advanced screening procedures, while permitting low-risk passengers to be screened by less intrusive "standard" screening procedures.

Standard checkpoint 352 may be configured with conventional passenger and baggage screening capabilities. Typical standard checkpoints include, for example, X-ray detection systems for scanning passenger baggage, and metal detection systems for screening passengers for weapons. Some systems even include a trace explosives machine which is often implemented to perform random screening of passenger baggage.

ATSC 10 is shown having baggage, passenger and secondary screening zones 15, 20 and 25, and is in communication with combined user interface (CUI) 242 operated by checkpoint supervisor 354. It is to be realized that the baggage, passenger and secondary screening zones may be implemented using any of the various combinations of explosives, weapons, and screening systems and portals described herein.

Passenger screening may be accomplished as follows. As indicated in block 356, the passenger may first approach a passenger check-in station. The passenger check-in station may be implemented as part of an airline's front counter baggage check or the check-in station may be implemented as a dedicated screening point. In block 358, the identity of the passenger may then be verified using any suitable method (for example, driver's license, state-issued ID card, passport, and the like).

The passenger may then be generally identified as either a "high-risk" or "low-risk" passenger based upon some predetermined selection criteria A high-risk passenger is one who requires more comprehensive screening at ATSC 10, while a low-risk passenger is one who requires a less stringent level of screening at standard checkpoint 352. In some embodiments, passenger threat level data 244 may be used to determine the risk status of passengers. For example, the passenger threat level data may indicate the passenger poses a "high-risk," which would require the passenger to pass through the ATSC 10 (block 362). On the other hand, if the passenger threat level data indicates that the passenger poses a "low" security risk, the passenger may be directed to the standard checkpoint for screening. Another alternative may be where a checkpoint employee determines the risk status of a passenger based upon objective or subjective observations of the passenger. It is therefore to be understood that the risk status of passengers may be determined based upon a variable range of possible parameters, the specifics of which are not essential to the present invention.

As indicated in block 364, if the passenger successfully passes the standard checkpoint screening process, they may be permitted to pass to checkpoint exit gate 90. However, if the passenger fails the standard checkpoint screening, they may be directed to the ATSC 10 for more comprehensive screening.

If a passenger requires screening by the ATSC 10, they will either be rejected or accepted. If the passenger and any associated baggage successfully pass all of the required screening systems and portals of the ATSC, then the passenger may be allowed to pass to the checkpoint exit gate. However, if the passenger fails any of the screening systems of the ATSC, they may be detained by law enforcement for further investigation (block 85).

Figure 15:
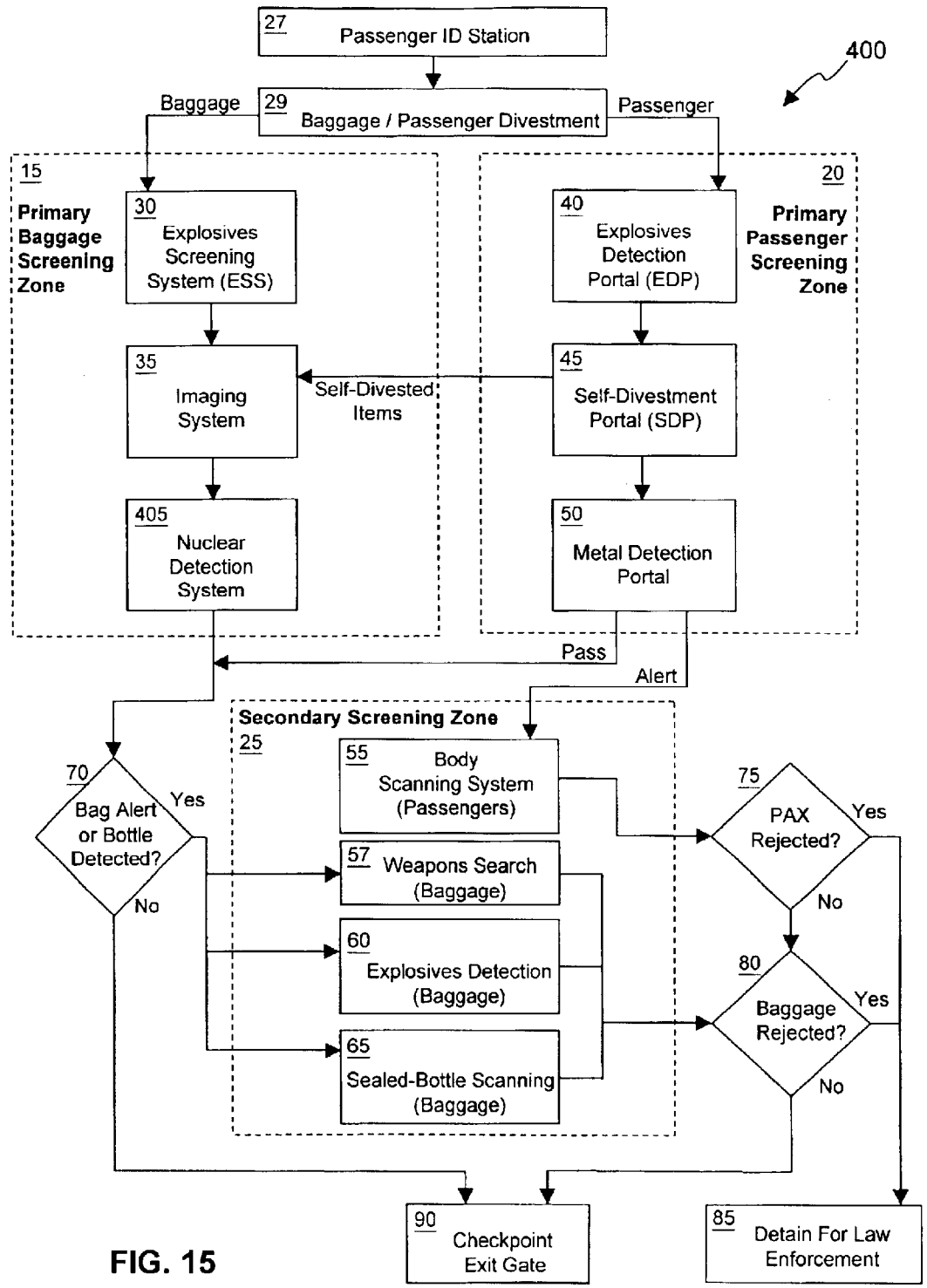
FIG. 15 is a block diagram showing an alternative embodiment of an advanced technology screening checkpoint of the present invention.

FIG. 15 shows another alternative embodiment of an advanced technology screening checkpoint 400 of the present invention. Checkpoint 400 generally includes primary baggage screening zone 15, primary passenger screening zone 20 and secondary screening zone 25. In contrast to the other embodiments, checkpoint 400 includes a nuclear detection system 405 within the primary baggage screening zone.

The nuclear detection system may be implemented using any of a variety of conventional systems configured to detect the presence of radioactive materials in passenger baggage. An appropriately configured nuclear detection system can detect harmful radioactive materials including those that emit gamma radiation. In operation, baggage may be passed through the nuclear detection system for analysis. The nuclear detection system may then issue an alert or pass indication based on the detection of some threshold level of radiation present within the baggage.

Figure 16:
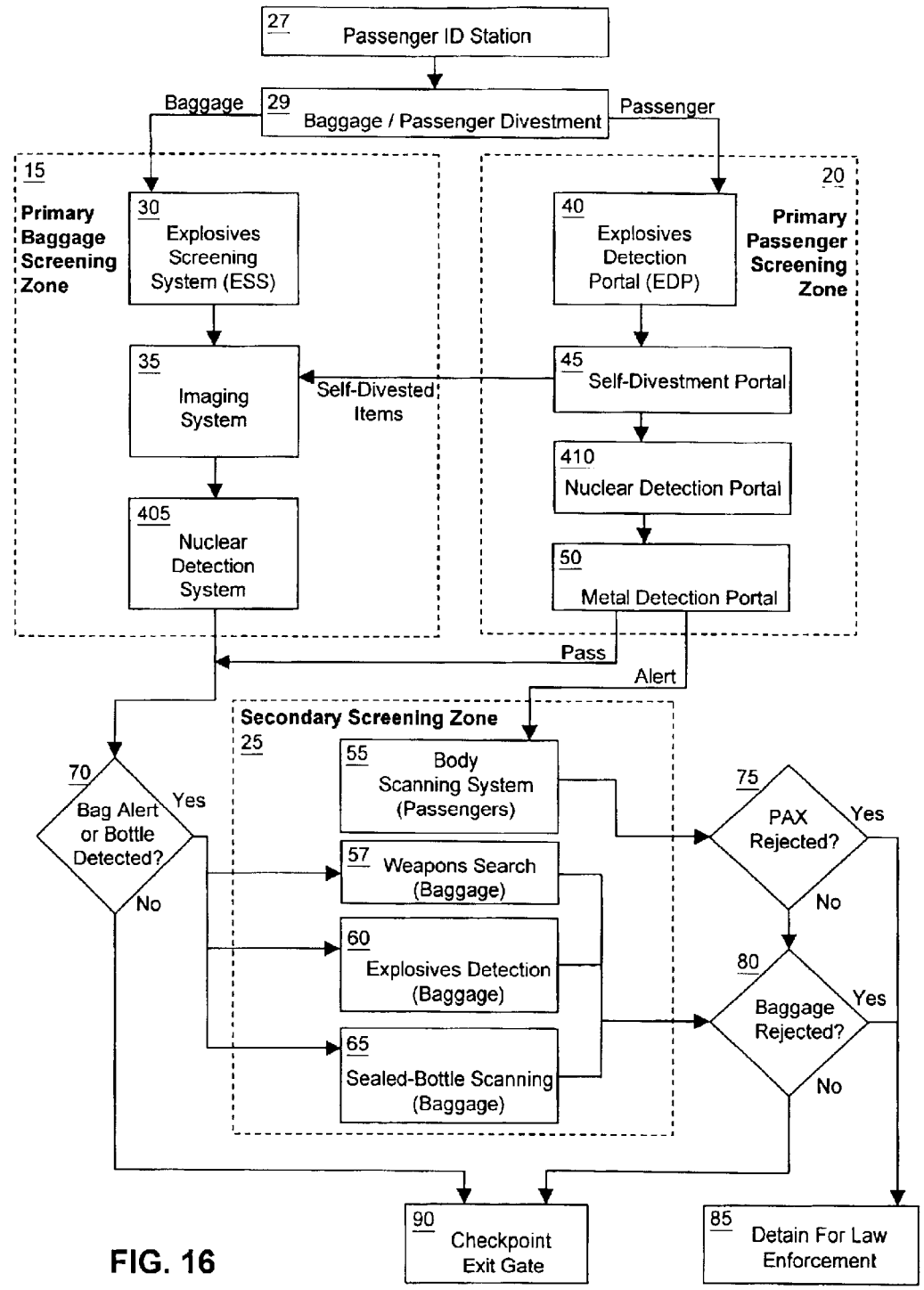
FIG. 16 is a block diagram showing an yet another alternative embodiment of an advanced technology screening checkpoint of the present invention.

If desired, the nuclear detection system may be alternatively located at the secondary screening zone. Another possible variation would be to configure the nuclear detection system as a walk through portal so that it may be implemented as part of the primary or secondary passenger screening process, separately or in addition to the baggage nuclear detection system. An example of a nuclear detection system 410 configured as a walk through portal within the primary passenger screening zone is shown in FIG. 16.

Figure 17:
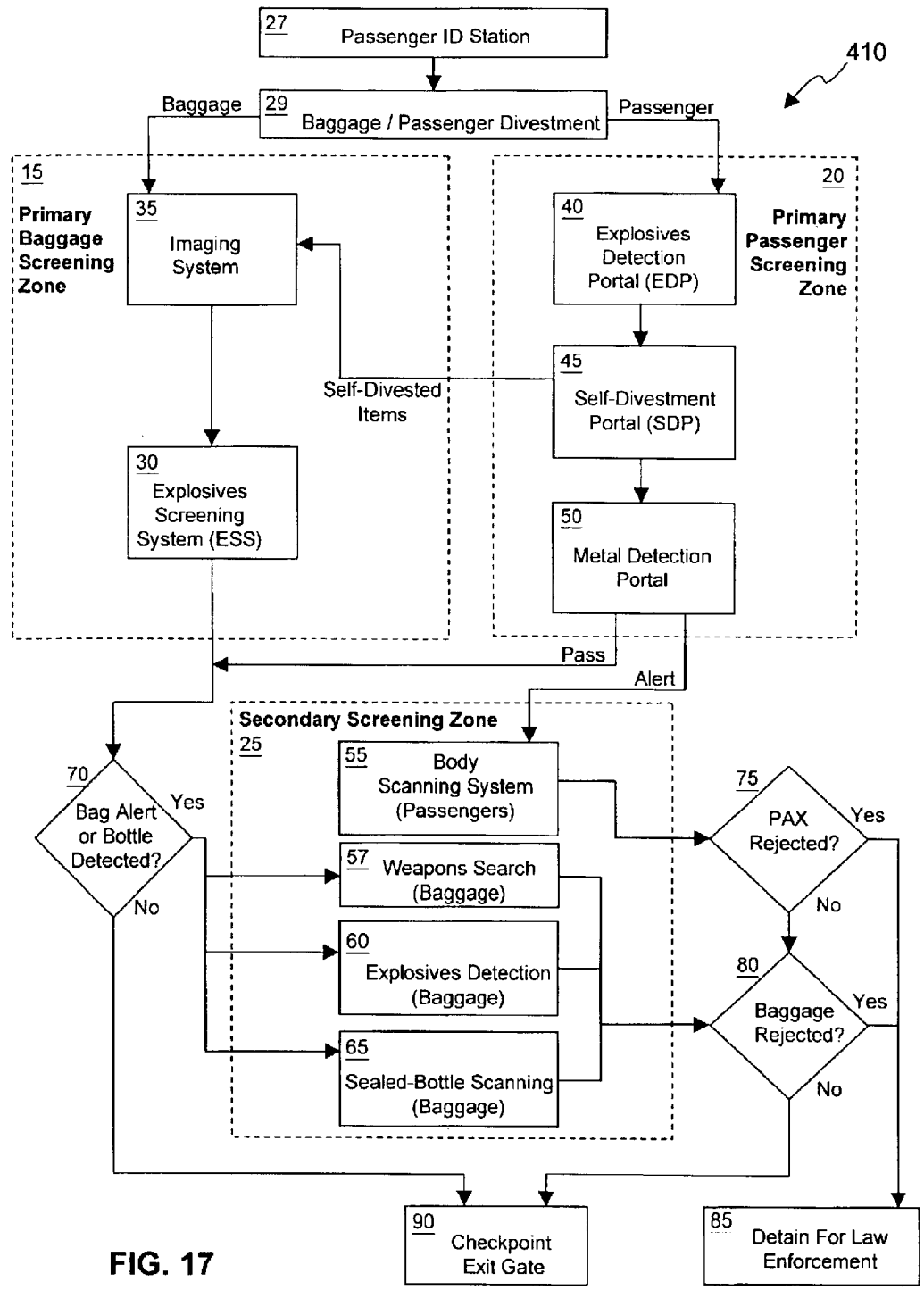
FIG. 17 is a block diagram showing still another alternative embodiment of an advanced technology screening checkpoint of the present invention.

FIG. 17 is a block diagram of an alternative embodiment of an advanced technology screening checkpoint 410 of the present invention. This particular embodiment is similar in many respects to other embodiments, with a notable distinction relating to the arrangement of the screening systems of baggage screening zone 15. In this figure, the screening systems of the baggage screening zone are arranged in such a manner that passenger baggage is screened first by imaging system 35, followed by screening by explosives screening system 30. This arrangement is useful when explosives screening of self-divested items from passengers is required or desired.

While the invention has been described in detail with reference to disclosed embodiments, various modifications within the scope and spirit of the invention will be apparent to those of working skill in this technological field. It is to be appreciated that features described with respect to one embodiment typically may be applied to other embodiments. Therefore, the invention properly is to be construed with reference to the claims.

What is claimed is:

1. A combined systems user interface (CUI) providing centralized monitoring of a screening checkpoint system, said CUI comprising:
    a baggage screening status region adapted to display screening information generated by an explosives screening system and a baggage imaging system configured within a baggage screening zone;
    a passenger screening status region adapted to display screening information generated by an explosives detection portal and a metal detection portal configured within a passenger screening zone; and
    a secondary screening status region adapted to display screening information generated by a body scanning system and an enhanced explosives screening system configured within a secondary screening zone.

2. The interface according to claim 1, wherein said baggage screening status region is further adapted to display images of baggage screened by said baggage imaging system.

3. The interface according to claim 1, wherein said baggage screening status region is further adapted to display screening information generated by a nuclear detection system adapted to detect threshold levels of radioactive materials present in screened baggage, wherein said nuclear detection system is configured within said baggage screening zone.

4. The interface according to claim 1, wherein said passenger screening status region is further adapted to display screening information generated by a nuclear detection system adapted to detect threshold levels of radioactive materials present on a passenger, wherein said nuclear detection system is configured within said passenger screening zone.

5. The interface according to claim 1, wherein said passenger screening status region is further adapted to display screening information generated by a self-divestment portal configured within said passenger screening zone.

6. The interface according to claim 5, wherein said passenger screening status region is further adapted to display images of an individual passenger and a location of metallic items detected on said individual passenger, wherein said images are generated by a camera working in cooperation with said self-divestment portal.

7. The interface according to claim 1, wherein said secondary screening status region is further adapted to display images of an individual passenger and a location of any threat objects detected on said individual passenger, wherein said images are generated by said body scanning system.

8. The interface according to claim 1, wherein said secondary screening status region is further adapted to display screening information generated by a sealed-bottle scanning system configured within said secondary screening zone.

9. The interface according to claim 1, and further comprising:
screening system control capabilities providing an ability to modify screening sensitivity levels of at least one screening system of said baggage, passenger, and secondary screening zones.

10. The interface according to claim 9, wherein said screening sensitivity levels can be manually modified by a human operator.

11. The interface according to claim 9, wherein said screening sensitivity levels can be automatically modified in response to threat level data provided by a passenger threat level identification system working in cooperation with said interface.

12. The interface according to claim 1, said interface further comprising:
an entry gate control providing an ability to moderate passenger flow into said screening checkpoint system.

13. The interface according to claim 1, said interface further comprising:
an exit gate control providing an ability to moderate passenger flow into a secured area protected by said screening checkpoint system.

14. The interface according to claim 1, said interface further comprising:
a threat assessment region adapted to display a threat level of an identified passenger screened by said screening checkpoint system, wherein said threat level is based upon data provided by a passenger threat level identification system.

15. The interface according to claim 1, said interface further comprising:
a threat assessment region adapted to display a threat level of an identified passenger screened by said screening checkpoint system, wherein said threat level is based upon screening results generated by individual screening systems of said baggage, passenger, and secondary screening zones.

16. The interface according to claim 1, said interface further comprising:
a passenger information region adapted to display passenger data, wherein said passenger data is provided by a passenger ID station configured with said screening checkpoint system.

17. The interface according to claim 1, wherein each of said baggage, passenger, and secondary screening status regions are represented on a single display device.

18. The interface according to claim 1, wherein each of said baggage, passenger, and secondary screening status regions are represented on individual display devices.

19. The interface according to claim 1, wherein each of said baggage, passenger, and secondary screening status regions are represented on a single display device configured with a portable computer.

20. The interface according to claim 1, wherein said interface is proximately located relative to individual screening systems of said baggage, passenger, and secondary screening zones.

21. The interface according to claim 1, wherein said interface is remotely located relative to individual screening systems of said baggage, passenger, and secondary screening zones.

22. A method for providing centralized monitoring of a screening checkpoint system, said method comprising:
providing a combined systems user interface (CUI) comprising baggage, passenger, and secondary screening status regions;
displaying baggage screening information in said baggage screening status region, wherein said baggage screening information is generated by an explosives screening system and a baggage imaging system configured within a baggage screening zone;
displaying passenger screening information in said passenger screening status region, wherein said passenger screening information is generated by an explosives detection portal and a metal detection portal configured within a passenger screening zone; and
displaying secondary screening information in said secondary screening status region, wherein said secondary screening information is generated by a body scanning system and an enhanced explosives screening system configured within a secondary screening zone.

23. The method according to claim 22, said method further comprising:
displaying images of baggage screened by said baggage imaging system in said baggage screening status region.

24. The method according to claim 22, said method further comprising:
displaying screening information generated by a nuclear detection system adapted to detect threshold levels of radioactive materials present in screened baggage, wherein said screening information generated by said nuclear detection system is displayed in said baggage screening status region.

25. The method according to claim 22, said method further comprising:
displaying screening information generated by a nuclear detection system adapted to detect threshold levels of radioactive materials present on a passenger, wherein said screening information generated by said nuclear detection system is displayed in said passenger screening status region.

26. The method according to claim 22, said method further comprising:
displaying screening information generated by a self-divestment portal in said passenger screening status region, wherein said self-divestment portal is configured within said passenger screening zone.

27. The method according to claim 26, said method further comprising:
displaying images of an individual passenger and a location of metallic items detected on said individual passenger in said passenger screening status region, wherein said images are generated by a camera working in cooperation with said self-divestment portal.

28. The method according to claim 22, said method further comprising:
   displaying images of an individual passenger and a location of any threat objects detected on said individual passenger in said secondary screening status region, wherein said images are generated by said body scanning system.

29. The method according to claim 22, said method further comprising:
   displaying screening information generated by a sealed-bottle scanning system in a secondary screening status region, wherein said sealed-bottle scanning system is configured within said secondary screening zone.

30. The method according to claim 22, said method further comprising:
   providing screening system control capabilities at said combined systems user interface (CUI), wherein said screening system control capabilities provide an ability to modify screening sensitivity levels of at least one screening system of said baggage, passenger, and secondary screening zones.

31. The method according to claim 30, wherein said screening sensitivity levels can be manually modified by a human operator.

32. The method according to claim 30, wherein said screening sensitivity levels can be automatically modified in response to threat level data provided by a passenger threat level identification system working in cooperation with said combined systems user interface (CUI).

33. The method according to claim 22, said method further comprising:
   controlling an entry gate to moderate passenger flow into said screening checkpoint system.

34. The method according to claim 22, said method further comprising:
   controlling an exit gate to moderate passenger flow into a secured area protected by said screening checkpoint system.

35. The method according to claim 22, wherein said combined systems user interface (CUI) further comprises:
   a threat assessment region adapted to display a threat level of an identified passenger screened by said screening checkpoint system, wherein said threat level is based upon data provided by a passenger threat level identification system.

36. The method according to claim 22, wherein said combined systems user interface (CUI) further comprises:
   a threat assessment region adapted to display a threat level of an identified passenger screened by said screening checkpoint system, wherein said threat level is based upon screening results generated by individual screening systems of said baggage, passenger, and secondary screening zones.

37. The method according to claim 22, wherein said combined systems user interface (CUI) further comprises:
   a passenger information region adapted to display passenger data, wherein said passenger data is provided by a passenger ID station configured with said screening checkpoint system.

38. The method according to claim 22, wherein each of said baggage, passenger, and secondary screening status regions are represented on a single display device.

39. The method according to claim 22, wherein each of said baggage, passenger, and secondary screening status regions are represented on individual display devices.

40. The method according to claim 22, wherein each of said baggage, passenger, and secondary screening status regions are represented on a single display device configured with a portable computer.

41. The method according to claim 22, wherein said interface is proximately located relative to individual screening systems of said baggage, passenger, and secondary screening zones.

42. The method according to claim 22, wherein said interface is remotely located relative to individual screening systems of said baggage, passenger, and secondary screening zones.

43. A combined systems user interface (CUI) providing centralized monitoring of a screening checkpoint system, said CUI comprising:
   a baggage screening status region adapted to display screening information generated by at least one baggage screening system configured within a baggage screening zone;
   a passenger screening status region adapted to display screening information generated by at least one passenger screening system configured within a passenger screening zone; and
   a screening system controller for modifying screening sensitivity levels of at least one screening system configured within said baggage and passenger screening zones.

44. The interface according to claim 43, said interface further comprising:
   a secondary screening status region adapted to display screening information generated by an enhanced explosives screening system configured within a secondary screening zone.

45. The interface according to claim 43, wherein said screening sensitivity levels can be manually modified by a human operator.

46. The interface according to claim 43, wherein said screening sensitivity levels can be automatically modified in response to threat level data provided by a passenger threat level identification system working in cooperation with said interface.

47. A method for providing centralized monitoring of a screening checkpoint system, said method comprising:
   displaying baggage screening information in said baggage screening status region, wherein said baggage screening information is generated by at least one baggage screening system configured within a baggage screening zone;
   displaying passenger screening information in said passenger screening status region, wherein said passenger screening information is generated by at least one passenger screening system configured within a passenger screening zone; and
   providing a screening system controller for modifying screening sensitivity levels of at least one screening system of said baggage and passenger screening zones.

48. The method according to claim 47, said combined systems user interface (CUI) further comprising:
   a secondary screening status region adapted to display screening information generated by an enhanced explosives screening system configured within a secondary screening zone.

49. The method according to claim 47, wherein said screening sensitivity levels can be manually modified by a human operator.

50. The method according to claim 47, wherein said screening sensitivity levels can be automatically modified in response to threat level data provided by a passenger threat level identification system working in cooperation with said combined systems user interface (CUI).

* * * * *